United States Patent
Shimazaki et al.

(10) Patent No.: US 6,611,744 B1
(45) Date of Patent: *Aug. 26, 2003

(54) STEERING ASSIST APPARATUS FOR TRAVELING IN REVERSE

(75) Inventors: Kazunori Shimazaki, Aichi-ken (JP); Koji Hika, Aichi-ken (JP); Satoshi Yamada, Aichi-ken (JP); Isao Suzuki, Aichi-ken (JP); Masahiko Ando, Aichi-ken (JP); Tomio Kimura, Aichi-ken (JP); Kousuke Teramura, Aichi-ken (JP); Hisashi Kuriya, Aichi-ken (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/807,348
(22) PCT Filed: Aug. 8, 2000
(86) PCT No.: PCT/JP00/05311
§ 371 (c)(1), (2), (4) Date: Jul. 13, 2001
(87) PCT Pub. No.: WO01/12472
PCT Pub. Date: Feb. 22, 2001

(30) Foreign Application Priority Data

| Aug. 12, 1999 | (JP) | 11/228435 |
| Sep. 8, 1999 | (JP) | 11/254191 |
| Sep. 28, 1999 | (JP) | 11/274815 |
| Mar. 9, 2000 | (JP) | 2000/065283 |
| Jun. 27, 2000 | (JP) | 2000/192782 |

(51) Int. Cl.[7] ............................................. G06F 7/00
(52) U.S. Cl. ..................... 701/41; 701/42; 180/168; 180/443; 180/204; 303/146
(58) Field of Search ....................... 701/41, 42, 79; 303/140, 146; 180/167, 168, 169, 443, 446, 204

(56) References Cited

U.S. PATENT DOCUMENTS

| 5,638,279 A | * | 6/1997 | Kishi et al. | 701/200 |
| 5,815,825 A | * | 9/1998 | Tachibana et al. | 701/23 |
| 6,320,497 B1 | * | 11/2001 | Fukumoto et al. | 340/425.5 |
| 2002/0104700 A1 | * | 8/2002 | Shimazaki et al. | 180/204 |

FOREIGN PATENT DOCUMENTS

| JP | 10-244891 | 9/1998 | B60R/21/00 |
| JP | 11-157404 | 6/1999 | B60R/21/00 |

* cited by examiner

Primary Examiner—Gertrude Arthur
(74) Attorney, Agent, or Firm—Morgan & Finnegan, LLP

(57) ABSTRACT

A steering assist apparatus includes a camera for picking up the rear side of a vehicle, a monitor disposed in a driver's compartment of the vehicle, a steering angle sensor for detecting a steering angle of a steering wheel, and a display controlling unit for displaying on the monitor an image through said camera when the vehicle reverses and for superimposing and displaying on said monitor a guide display for assisting the drive of the vehicle when the vehicle is to be parked. The guide display includes a steering start guide line fixedly displayed in a predetermined position of an image field of the monitor for guiding a steering start position for parking, and a steering amount guide mark moved and displayed along the steering start guide line on the image field of the monitor in correspondence with a steering angle of the steering wheel detected by the steering angle sensor. The driver performs the steering operation of the vehicle while recognizing the position for the opposite turning of the steering wheel and the steering amount and the steering start position for parking on the basis of the image on the rear side of the vehicle and the steering amount guide mark and the steering start guide line.

31 Claims, 14 Drawing Sheets

STEERING ASSIST APPARATUS FOR TRAVELING IN REVERSE

TECHNICAL FIELD

The present invention relates to a steering assist apparatus, and more particularly to an apparatus for assisting a steering wheel operation in parking.

BACKGROUND ART

Conventionally, an apparatus has been proposed which displays a rear side view of a vehicle on a monitor in the case where the target place is out of sight from a driver due to the dead angle of the vehicle when the vehicle reverses. For example, Japanese Patent Examined Publication No. 2-36417 discloses a rear view monitoring apparatus for a vehicle which comprises a television camera for picking up a rear view of the vehicle, a monitor television set for imaging an image picked up by the camera, a sensor for outputting an information signal related to a tire steering angle and a circuit for generating a marker signal in response to the information signal from this sensor and superimposing the marker on the television image field. In this apparatus, the tire steering angle data and the marker position data along the reverse direction of the vehicle corresponding to its steering angle are stored in a ROM, and a predicted reverse locus of the vehicle in correspondence with the steering angle at that time is superimposed and displayed on the image picked up by the television camera on the television view field as a row of the markers.

By such an apparatus, since the predicted reverse locus of the vehicle in correspondence with the steering angle together with the view field of the conditions of the road on the rear side is shown on the image field of the monitor television when the vehicle reverses, the driver may reverse the vehicle by manipulating the steering wheel while watching the television image field without looking back.

However, such a conventional apparatus is simply an apparatus that shows the relationship between a hindrance on the rear side of the vehicle and the predicted reverse locus by showing the predicted reverse locus of the vehicle and provides reference information to the driver as to whether the vehicle may avoid the hindrance or not.

In the case where the vehicle is to be parked in parallel, parking the vehicle suitably in a parking space without finely adjusting the steering wheel steering amount during the reverse motion leads to the possibility that the driver may park the vehicle in parallel with paying his or her attention to the outside of the vehicle without being nervous about the steering wheel operation. This is one of the important advantages for the suitably parking the vehicle in parallel. However, the conventional rear view monitoring apparatus involves a problem that it is difficult for the driver to judge where the steering wheel should start to be operated and how much the steering wheel should be operated to park the vehicle suitably in the parking space without finely adjusting the steering wheel steering amount when the vehicle reverses in the case where the vehicle is close to the parking space in which the vehicle is to be parked in parallel. Thus, it is impossible to sufficiently assist the driver for the suitable parallel parking by the conventional rear view monitoring apparatus.

In the case where the vehicle is to be parked in line, for example, the vehicle is reversed in parallel with a road, the vehicle is entered into a parking space by operating the steering wheel at a suitable position, and the vehicle is guided into the target parking position by turning the steering wheel in the reverse direction. However, in the conventional rear view monitoring apparatus, only with the driver viewing the predicted reverse locus of the vehicle and the rear view field on the television image field, it is difficult for the driver to judge where the steering wheel should start to be operated, where the steering wheel should be turned and how much the steering wheel steering amount should be selected. Accordingly, if it is possible to know the operation timing or the specific operation method in response to the position of the vehicle, it is possible even for the driver who is not familiar with the operation to easily operate the steering wheel. Also, if the steering information may be also obtained from other than the television image field, it is unnecessary for the driver to watch continually the television image field and it is preferable for the driver to see the outside of the vehicle.

DISCLOSURE OF THE INVENTION

In view of the foregoing defects, an object of the present invention is to provide a steering assist apparatus by which the driver may readily recognize the steering timing when the driver parks the vehicle.

Another object of the invention is to provide a steering assist apparatus by which the driver may readily recognize the steering amount that is needed for parking.

According to a first aspect of the invention, there is provided a steering assist apparatus comprising: a camera for picking up the rear side of a vehicle; a monitor disposed in a driver's compartment of the vehicle; a steering angle sensor for detecting a steering angle of a steering wheel; and a display controlling means for displaying an image through the camera on the monitor when the vehicle reverses and for superimposing and displaying a guide display on the monitor for assisting the drive of the vehicle during parking, wherein the guide display includes a steering start guide line fixedly displayed in a predetermined position of an image field of the monitor for guiding a steering start position for parking, and a steering amount guide mark moved and displayed along the steering start guide line on the image field of the monitor in correspondence with a steering angle of the steering wheel detected by the steering angle sensor.

According to a second aspect of the invention, there is provided a steering assist apparatus for assisting a steering operation when a vehicle is reversed to be parked, comprising a yaw angle detecting means for detecting a yaw angle of the vehicle, a reference setting means for setting a zero position of the yaw angle, a steering angle sensor for detecting a steering angle of a steering wheel, and a guide means for identifying a position of the vehicle in accordance with the steering angle detected by the steering angle sensor and the yaw angle detected by the yaw angle detecting means and for providing steering information to the driver.

BEST MODE FOR CARRYING OUT THE INVENTION

The embodiments of the present invention will now be described with reference to the accompanying drawings.

First Embodiment

Figure 1:
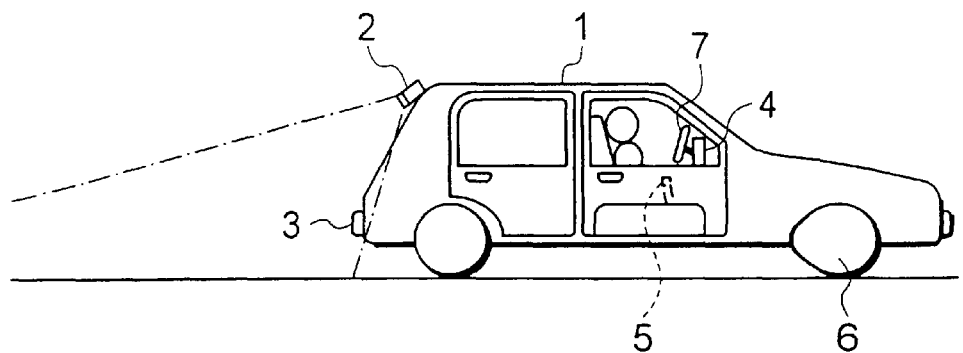
FIG. 1 is a side elevational view showing a vehicle on which mounted is a steering assist apparatus in accordance with a first embodiment of the present invention.

As shown in FIG. 1, a camera 2 for picking up a rear view of a vehicle 1 is mounted on a rear portion of the vehicle 1. A rear bumper 3 of the vehicle 1 is included on an end portion of the close side of the view field range of the camera 2. A monitor 4 that is composed of a color type liquid crystal display is disposed in the driver's compartment of the vehicle 1, used normally as a display device for a navigation system and adapted to display an image picked up by the camera 2 when a shift lever 5 in the driver's compartment is operated to a reverse position.

Front wheels 6 as steered wheels are operated by the operation of a steering wheel 7. A steering angle $\theta T$ is represented by a value $K\theta$ obtained by multiplying the steering angle $\theta$ of the steering wheel 7 by a coefficient K.

Figure 2:
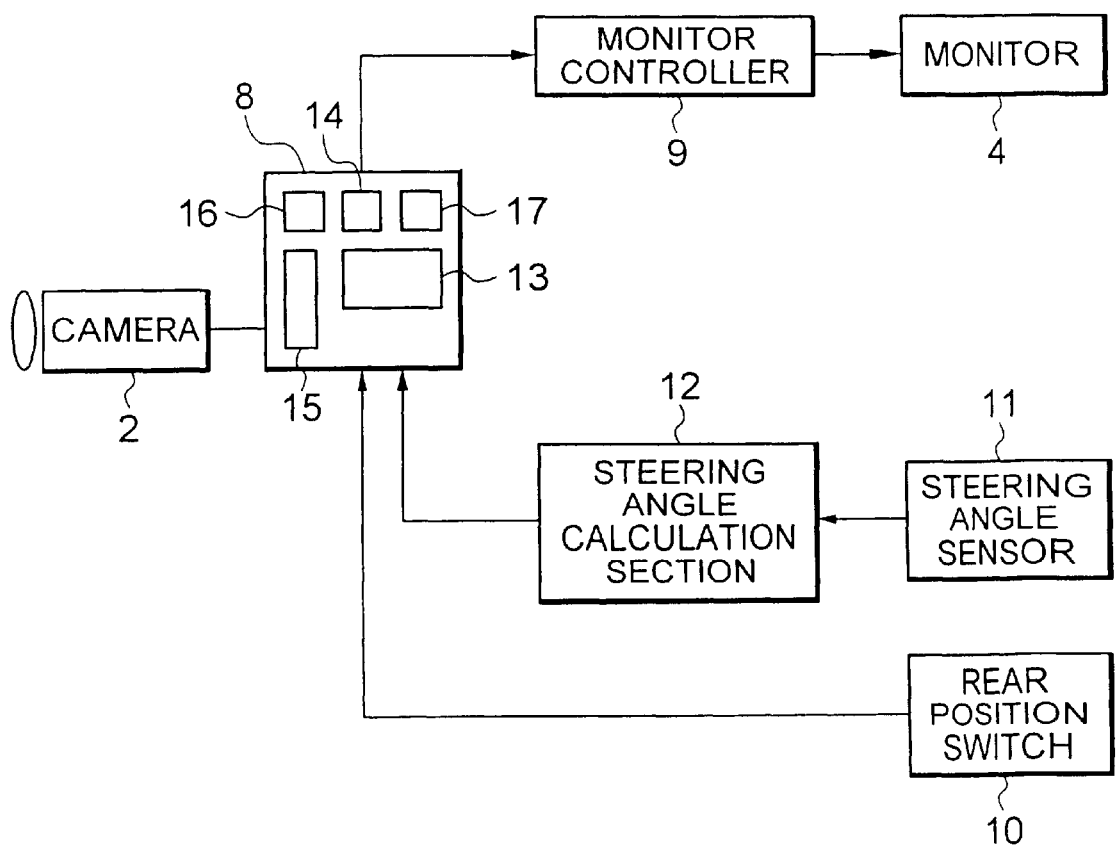
FIG. 2 is a block diagram showing a structure of the steering assist apparatus according to the first embodiment of the present invention.

A structure of a steering assist apparatus in accordance with a first embodiment of the present invention is shown in FIG. 2. An image processing unit 8 as a display controlling means is connected to the camera 2, and a monitor 4 is connected to the image processing unit 8 through a monitor controller 9. A rear position switch 10 for detecting whether the shift lever 5 is switched to the reverse position or not is provided in the vehicle 1, and this rear position switch 10 is connected to the image processing unit 8. Furthermore, a steering angle sensor 11 for detecting the steering angle $\theta$ of the steering wheel 7 is mounted on a steering shaft of the steering wheel 7, and this steering angle sensor 11 is connected to the image processing unit 8 through a steering angle calculation section 12.

Normally, the monitor controller 9 receives a display signal from the navigation system (not shown) to display it on the monitor 4. When the display signal is inputted from the image processing unit 8, a display on the monitor 4 is conducted on the basis of the display signal from the image processing unit 8. Also, the steering angle calculation section 12 calculates the steering angle $\theta T$ of the front wheels 6 from the steering angle $\theta$ of the steering wheel 7 detected by the steering sensor 11 and outputs it to the image processing unit 8.

The image processing unit 8 is provided with a CPU 13, a ROM 14 which stores a controlling program, an image processing processor 15 for processing the image data from the camera 2, an image memory 16 for storing the image data processed by the image processing processor 15 and a RAM 17 for working.

The display controlling means is formed by such an image processing unit 8, the monitor controller 9, the rear position switch 10, the steering angle sensor 11 and the steering angle calculation section 12.

The CPU 13 operates on the basis of the controlling program stored in the ROM 14. When the CPU 13 detects the fact that the shift lever 5 is switched to the reverse position by the rear position switch 10, the CPU 13 displays each guide display of steering start guide lines 100 and 110, a vehicle width guide line 140 and a vehicle locus guide line 20 shown in FIG. 3A and the steering amount mark 120 shown in FIG. 3C in a view field 19 of the monitor 4 in a superimposed manner on the image of the camera 2.

Figure 3A:
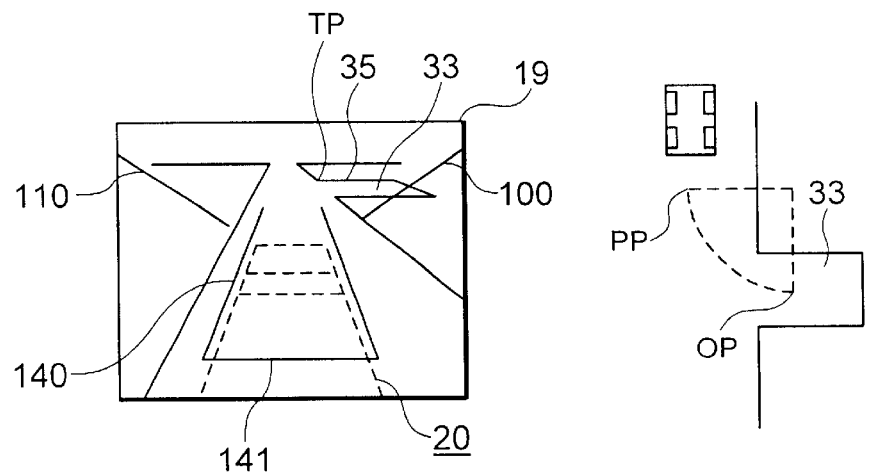
FIGS. 3A to 3F are views schematically showing, in a stepwise manner, monitor image fields and positions of the vehicle in parking in parallel in accordance with the first embodiment, respectively.

A display data of the steering start guide lines 100 and 110 to be displayed in a fixed manner at predetermined positions of the image field 19 of the monitor 4 irrespective of the steering operation of the steering wheel 7 is stored in the ROM 14. The steering start guide lines 100 and 110, indicated by the solid lines of FIG. 3A, are line segments indicating suitable steering start positions for parking in parallel. The steering start guide line 100 is a steering start guide line for right reverse parking for performing the right reverse parking, and the steering start guide line 110 is a steering start guide line for left reverse parking for performing the left reverse parking.

Also, the steering amount mark 120 is, for example, a red circle sign displayed by the CPU 13 along the steering start guide line 100 or 110 in response to the magnitude of the steering wheel steering angle detected by the steering angle sensor 11. The larger the steering wheel steering angle $\theta$, the more downwardly on the image field 19 the steering amount mark 120 will move on the steering start guide line 100 in the case where the steering wheel is steered clockwise and on the steering start guide line 110 in the case where the steering wheel is steered counterclockwise, respectively.

Furthermore, a pair of right and left vehicle width guides 140 depicted by the solid lines in FIG. 3A is a guide for indicating the predicted positions of both side portions of the vehicle 1 in reversing straight by the CPU 13 on the basis of the full width data of the vehicle 1 stored in advance in the ROM 14, and depicts the hypothetical outer configuration lines of the horizontally projected pattern of the vehicle when the vehicle 1 is arranged in a hypothetical manner in contact with the rear bumper of the current vehicle position.

A line segment 141 on the lower side of the vehicle width guides 140 is a bumper line indicating the current position of the rear bumper of the vehicle.

Also, the CPU 13 calculates the predicted locus of the vehicle 1 in reversing with the steering angle θ of the steering wheel 7 at that time from the output signal of the steering angle calculation section 12. The vehicle locus guide line 20 indicates a guide of the vehicle width at the position corresponding to the steering angle θ on the basis of this predicted locus.

Figure 3B:
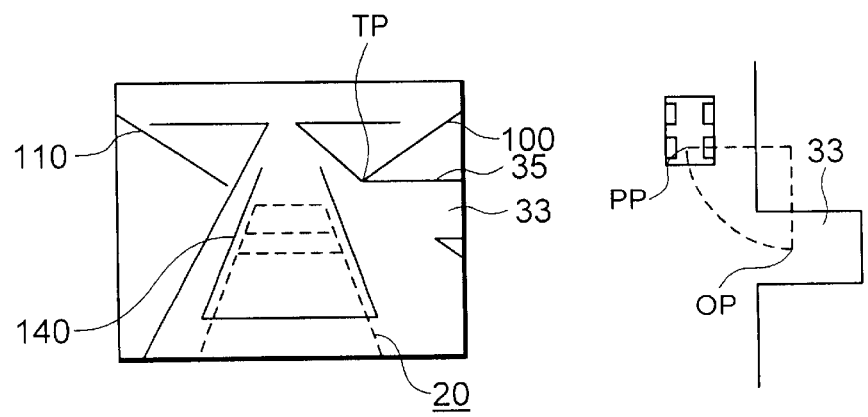
Figure 3C:
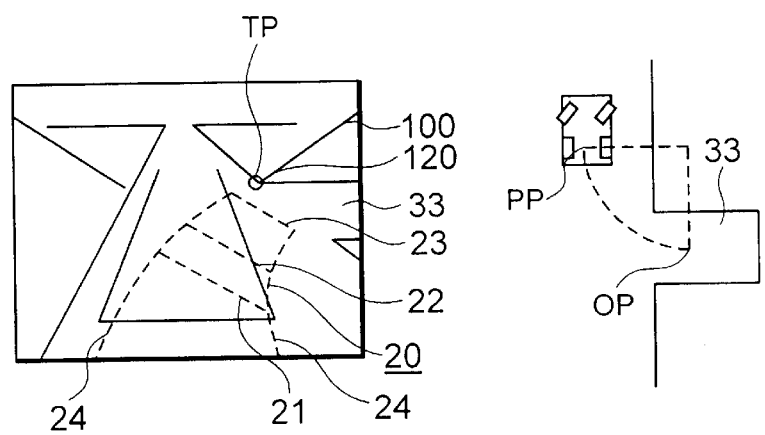

As shown by the dotted lines in FIG. 3C, the vehicle locus guide line 20 corresponds to the predicted locus of the vehicle 1 when reversed while keeping the steering angle θT of the front wheels at the angle of that time, and both ends of line segments 21, 22 and 23 indicate the position of the rear bumper in the case where the vehicle 1 reverses by one meter, 1.5 meters and 2.5 meters, respectively.

A method for depicting the steering start guide line 100 and the steering mark 120 on the image field 19 of the monitor 4 will now be described.

Figure 4:
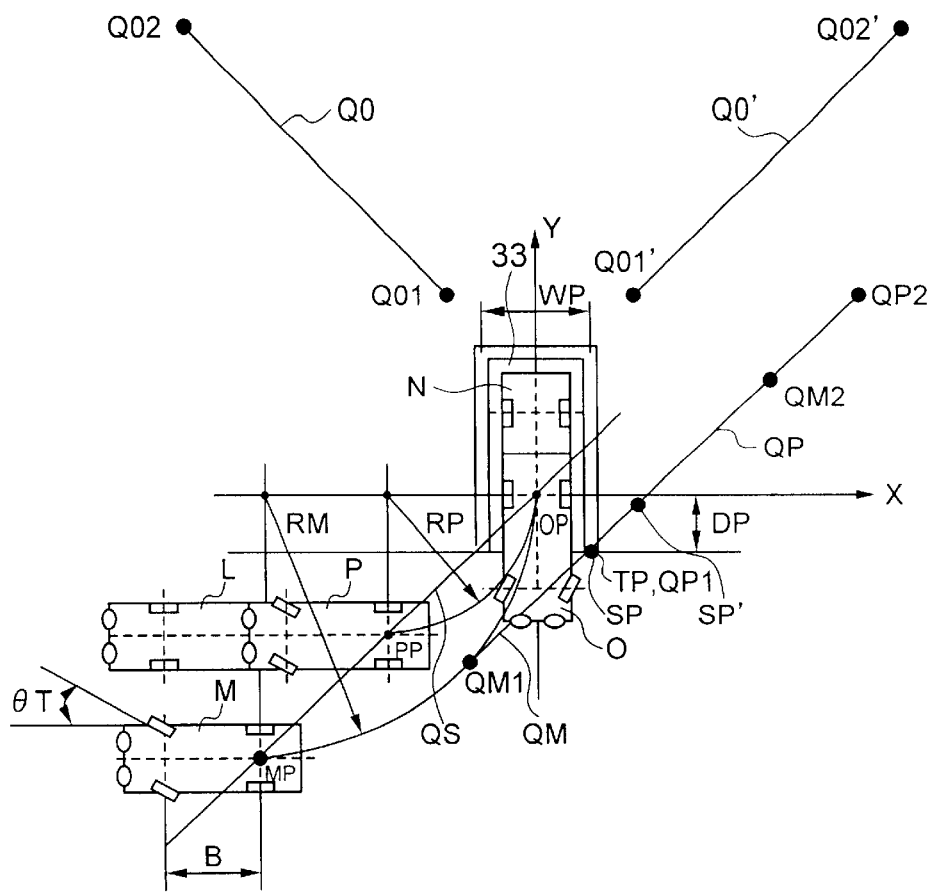
FIG. 4 is a view showing a method for depicting a guide display.

The steering start guide line 100 and the steering amount mark 120 are used for determining the steering start position of the vehicle 1 and the steering amount of the steering wheel at the steering start position corresponding to the positional relationship between the parking space 33 and the vehicle 1 as shown in FIG. 4 so that the vehicle 1 to be parked in parallel rotates at a constant vehicle rotational radius and the center of the rear axle of the vehicle 1 reaches the midpoint of the width WP (for example, 2.5 meters) of the parking space 33 at the position where the vehicle 1 enters into the inside of the parking space 33 by a predetermined distance DP (for example, 1.5 meters) from a gate of the parking space 33.

First of all, a suitable coordinate system is laid on the surface of the ground, and the line segments QP and QO which are bases for the steering start guide line 100 on the surface of the ground are assumed on this coordinate system.

In FIG. 4, characters L, P, O, N and M indicate positions of the vehicles, and a point TP at the gate end portion of the parking space 33 indicates the target point where the steering start guideline 100 is overlapped in the image field.

In the coordinate system on the ground surface, let the position where the vehicle enters into the inside of the parking space 33 by the predetermined length DP from the gate of the parking space 33, which is the midpoint of the width WP of the parking space 33, be assumed as the reference point OP. Let the reference point OP be assumed as the original point. The Y-axis positive direction (Y+) is in the longitudinal and rearward direction of the parking space 33 through the center of the width WP on the ground surface from this original point, and the rightward direction in FIG. 4 and perpendicular direction to the Y-axis is in the X-axis positive direction (X+).

The vehicle position P is such a vehicle position upon the steering start that the rear axle center of the vehicle 1 reaches the reference point OP when the steering wheel 7 is steered at the maximum steering amount of the steering wheel and the vehicle 1 rotates at an angle 90 degrees. The X abscissa $X_{pp}$ and the Y ordinate $Y_{pp}$ of the point PP which is the center of the rear axle of the vehicle 1 in this vehicle position P is given by the following equation:

$$X_{pp} = -Rp$$

$$Y_{pp} = -Rp$$

where Rp is the rotational radius of the rear axle center in the case where the steering wheel is steered at the maximum steering amount of the steering wheel.

The line segment QP is a straight line depicted from the target point TP in parallel with the straight line QS passing through the reference point OP and the point PP and is represented as a steering start guide line 100 on the image field 19 of the monitor 4 in the case where the vehicle 1 is in the vehicle position P.

Figure 5:
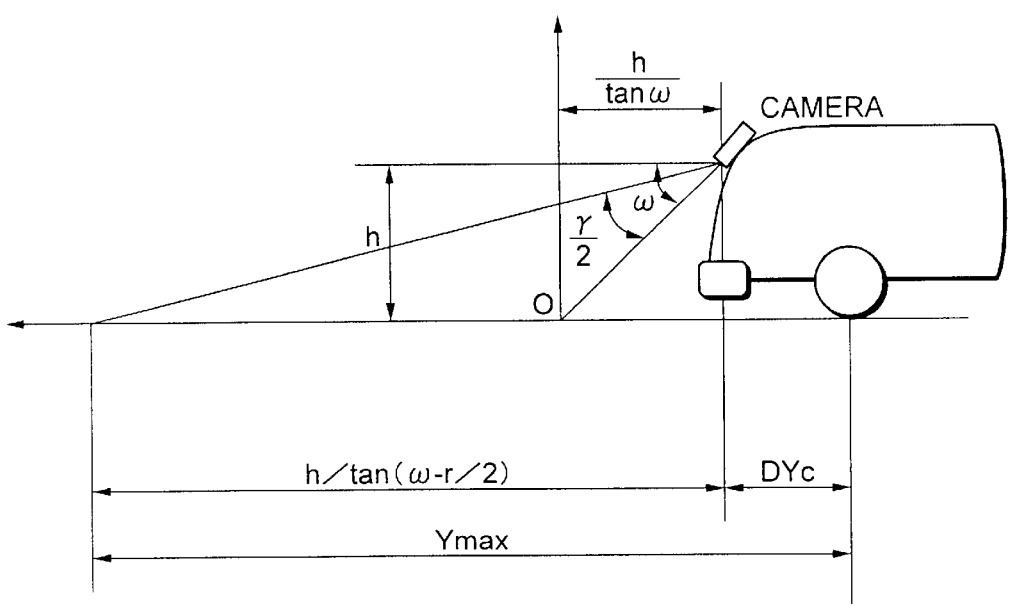
FIG. 5 is a side elevational view showing an image range of a camera of the steering assist apparatus according to the first embodiment.

One end point QP1 of the line segment QP is identified with the target point TP. On the other hand, another end point QP2 thereof is a point that determines the position of the steering start guide line 100 located at the top end of the image field 19 of the monitor 4. The maximum depicting distance Ymax that is the distance from the rear axle to the position indicated on the upper end of the image field 19 of the monitor 4 is calculated. Then, the end point QP2 is determined on the basis of the maximum depicting distance Ymax. The maximum depicting distance Ymax is given by the following equation as shown in FIG. 5:

$$Y\max = h/\tan(\omega - \gamma/2) + DYc$$

where h is the height of the camera mounted level, ω is the angle of depression of the camera, γ is the vertical view field angle of the camera, and DYc is the camera mounted position measured from the rear axle.

As shown in FIG. 4, the end point QP2 is obtained as an intersection between the straight line Y=Ymax and the straight line depicted from the target point TP in parallel with the straight line QS passing through the point PP and the reference point OP.

The line segment QO is represented as the steering start guide line 100 on the image field 19 of the monitor 4 in the case where the vehicle is in the vehicle position O.

Namely, the line segment QO is identified with the line segment QP obtained by rotating this coordinate system together with the vehicle when the vehicle rotationals through 90 degrees from the vehicle position P to come the vehicle position O and the center of the rear axle reaches the reference point OP.

The line segment QO corresponds to the line segment QP to obtained when each axis of the coordinate is subjected to the 90 degree coordinate conversion (X+→Y+, Y+→X−). The X abscissa $X_{QO1}$ and Y ordinate $Y_{QO1}$ of one end point QO1 of the line segment QO are given by the following equations:

$$X_{QO1} = Y_{pp} + DP = -Rp + DP$$

$$Y_{QO1} = X_{pp} + WP/2 = Rp + WP/2$$

The X abscissa $X_{QO2}$ and Y ordinate $Y_{QO2}$ of the other end point QO2 of the line segment QO are given by the following equations:

$$X_{QO2} = -Y\max + DP + WP/2$$

$$Y_{QO2} = Y\max$$

Also, the line segment QO' is a line segment that is symmetric to the line segment QO with respect to the Y-axis and is the line segment that becomes a base for the steering start guide line 110 when the vehicle is to be parked in parallel in the left and rear directions of the vehicle.

A method for calculating the point SP' on the ground surface that is a reference for indicating the steering amount guide mark 120 will now be described.

As shown in FIG. 4, the vehicle kept under the condition of the vehicle position M is assumed. Here, the vehicle position M is the vehicle position where the rear axle center is identified with the reference point OP by rotationaling the vehicle through 90 degrees with the rotational radius RM.

The rotational radius RM of the rear axle center and the steering angle θT of the front wheels 6 are related to each other by the following equation:

$$RM = B/\tan(\theta T)$$

where B is a wheel base and θT is the steering angle of the front wheels 6 that is the positive value irrespective of the right and left directions. Also, in case of θT=0, i.e., when the steering wheel is not steered, the steering amount guide mark 120 is not displayed.

The X abscissa $X_{MP}$ and Y ordinate $Y_{MP}$ of the rear axle center MP of the vehicle in the vehicle position M are given by the following equations:

$$X_{MP} = -RM$$

$$Y_{MP} = -RM$$

Then, the X abscissa $X_{SP}$ and Y ordinate $Y_{SP}$ of the point SP are determined as follows. Namely, the coordinate of the point SP is a coordinate corresponding to the target point TP when each axis is subjected to the 90 degree coordinate conversion (X+→Y+, Y+→X−) assuming the point MP as the original point.

$$X_{SP} = Y_{MP} + DP = -RM + DP = B/\tan(\theta T) + DP$$

$$Y_{SP} = -X_{MP} + WP/2 = RM + WP/2 = B/\tan(\theta T) + WP/2$$

The following processing is executed for the right and left steering wheel operations.

When the steering wheel turns clockwise, $-X_{SP}$ is substituted for $X_{SP}$. Therefore, the plus/minus sign is reversed. When the steering wheel turns counterclockwise, $X_{SP}$ is substituted for $X_{SP}$, the plus/minus sign is kept unchanged.

The point SP' that becomes the reference for the steering amount guide mark 120 will be calculated as follows.

When the steering wheel 7 of the vehicle 1 is operated gradually in the vehicle position M, the point SP' is obtained by substituting RM' for the RM in the equations described above where RM' is the rotational radius corresponding to the steering amount of the steering wheel at each time. The values of $X_{SP}$ and $Y_{SP}$ at this time are defined as the X abscissa and Y ordinate of the point SP', respectively. The point SP' is on the line segment QM which has the end points QM1 and QM2 and is identical with the line segment QP moved in parallel by the difference between the point PP and the point MP and the point SP' moves on the line segment QM corresponding to the value of RM'. It is possible for the driver to recognize the suitable steering amount of the steering wheel by adjusting the steering amount of the steering wheel so as to identify the steering amount guide mark 120 with the target point while looking at the position of the steering amount guide mark 120 depicted at the position corresponding to the point SP' on the image field 19 of the monitor 4 to be described later.

Subsequently, the line segments QO, QO' and SP' are depicted on the monitor 4 in the superimposed manner on the image picked up by the camera installed on the vehicle, which are the reference for the steering amount guide mark 120, the steering start guide lines 100 and 110.

The images picked up by camera 2 are displayed on the image field 19 of the monitor 4 so that the view of rear front side is displayed on the upward part of the monitor, the view of rear right side is displayed on the rightward part of the monitor and the view of rear left side is displayed on the leftward part of the monitor.

The background image is calculated by performing the conversion in view of the distortion component in projecting the points of the respective guide displays on the ground surface onto the points on the monitor 4 since the image includes the distortion due to the camera lens.

The operation of the steering assist apparatus will now be described by exemplifying the case where the vehicle 1 is to be parked in parallel in the parking space on the right rear side, according to FIGS. 3A to 3F.

Figure 3D:
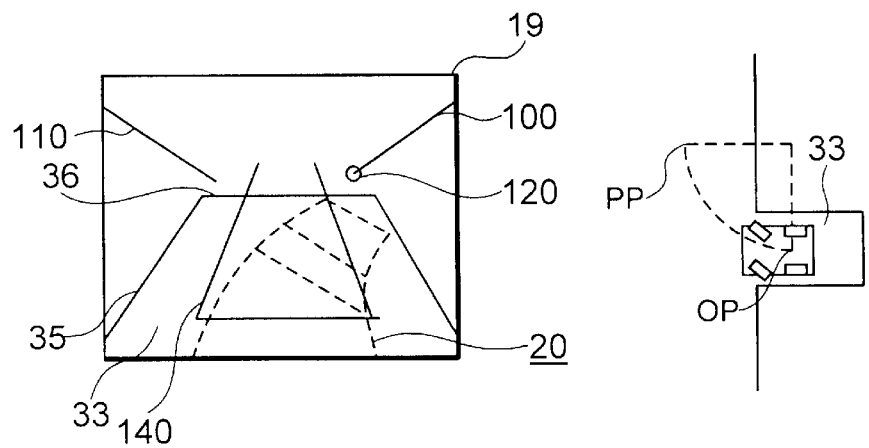
Figure 3E:
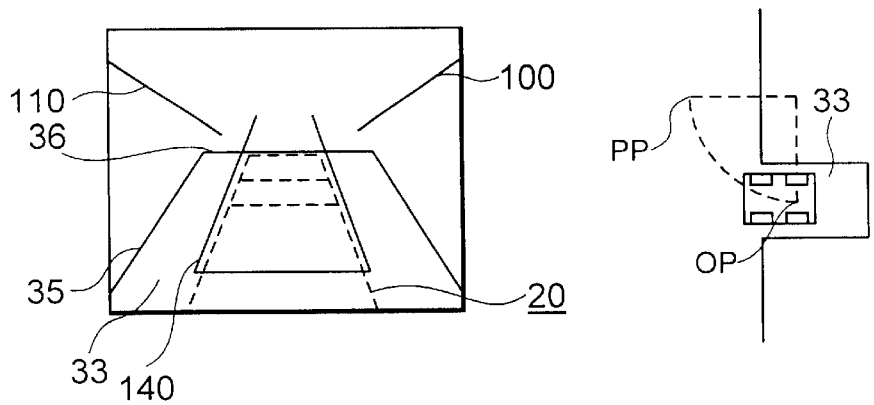
Figure 3F:
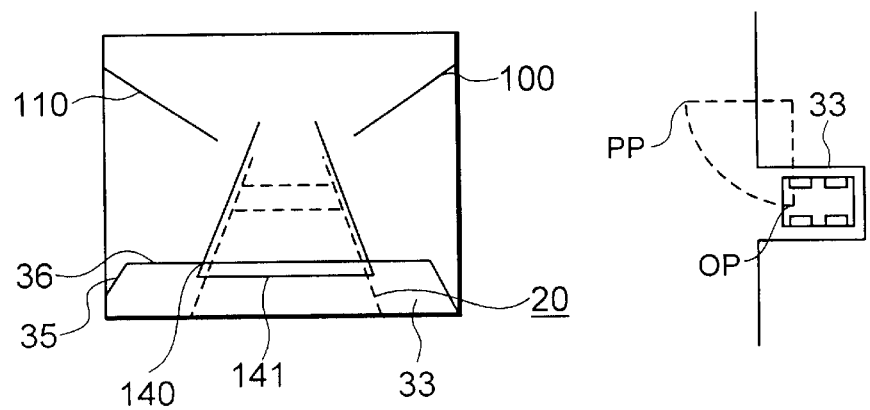

FIG. 3A corresponds to the vehicle position L of FIG. 4, FIGS. 3B and 3C correspond to the vehicle position P, FIGS. 3D and 3E correspond to the vehicle position O and FIG. 3F corresponds to the vehicle position N.

First of all, the driver passes on the side of the parking space 33 on the rear side of the vehicle where the driver would like to park the vehicle and stops the vehicle at a position where the rear portion of the vehicle passes by 2 to 3 meters from the parking space 33 at closely right angle with the parking space 33. Subsequently, at first, the driver confirms the positional relationship between his own vehicle and the parking space and the safety on the rear side of the vehicle in the visual observation and operates the shift lever 5 to the reverse position. At this time, on the basis of the detection signal from the rear position switch 10 by the switching operation of the shift lever 5, the image processing unit 8, as shown in FIG. 3A, displays the steering start guide lines 100 and 110, the vehicle width guide line 140 and the vehicle locus guide line 20 in the superimposed manner on the image of the rear side of the vehicle through the camera 2.

Then, the driver reverses the vehicle 1 straightly and stops it at the position where the target point TP at the end of the side parking frame line 35 on the remote side away from the vehicle of the parking space 33 is overlapped with the steering start guide line 100 as shown in FIG. 3B. Under the condition that the vehicle stops at that position, when the driver turns the steering wheel 7, the steering amount guide mark 120 is displayed on the steering start guide line 100. As the steering wheel 7 is being turned, the steering amount guide mark 120 moves downwardly on and along the steering start guide line 100. Then, as shown in FIG. 3C, the steering wheel 7 is steered up to the position where the steering amount guide mark 120 overlaps with the target point TP. When the steering amount guide mark 120 overlaps with the target point TP, the vehicle reverses while maintaining the steering wheel 7 at that steering angle.

Thus, the vehicle 1 reverses while rotationaling with the constant vehicle rotational radius in the range of about 90 degrees. The driver may enter the vehicle 1 suitably into the parking space 33 without finely adjusting the steering amount of the steering wheel.

Here, the driver enters the vehicle 1 into the parking space 33 and stops the vehicle 1 at the position where the vehicle width guide line 140 is kept in parallel with the side parking frame line 35, as shown in FIG. 3D. Subsequently, as shown in FIG. 3E, the driver return the steering wheel 7 back to the unsteered condition and start slowly the straight reverse drive. As shown in FIG. 3F, when the line segment 141 of the bumper line of the vehicle width guide line 140 has a suitable interval to the rear parking frame line 36, the vehicle 1 is stopped. Thus, the parallel parking has been finished.

Incidentally, the sector shape having a 90 degree central angle indicated in the dotted line in FIGS. 3A to 3F is obtained by depicting a sector shape from the point PP as the starting point to the reference point OP as the terminal point with the radius RP of FIG. 4.

Figure 6A:
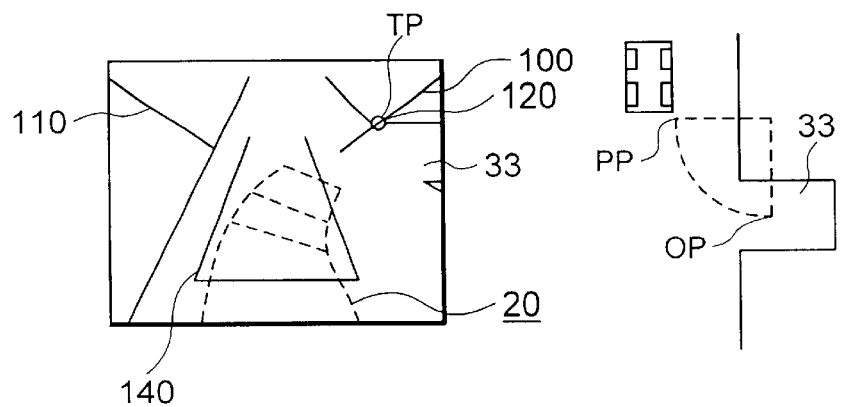
FIGS. 6A to 6C are views schematically showing the monitor image fields and the vehicle positions of the cases in which the vehicle positions are different when the steering starts for parallel parking in accordance with the first embodiment, respectively.

Also in the case where the position of the vehicle 1 is further from the parking space 33 than the vehicle position L of FIG. 4 when the parallel parking is started, the driver reverses the vehicle 1 straight in the same manner, and as shown in FIG. 6A, stops the vehicle at the position where the target point TP overlaps with the steering start guide line 100. Under the condition that the vehicle 1 stops at that position, the driver steers the steering wheel 7 up to the position where the steering amount guide mark 120 overlaps with the target point TP. When the steering amount guide mark 120 overlaps with the target point TP, the driver reverses the vehicle while maintaining the steering wheel 7 at that steering angle.

Figure 6B:
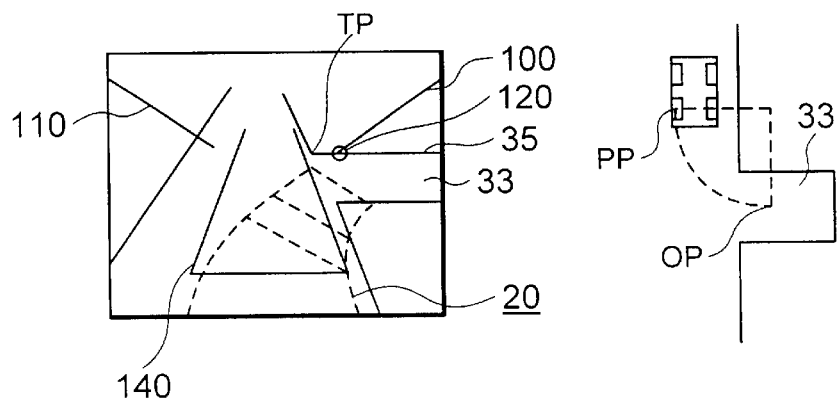

Also, in the case where the position of the vehicle 1 is closer to the parking space 33 than the vehicle position L of FIG. 4 when the vehicle starts to be parked in parallel, the driver reverses the vehicle straight in the same manner, and stops it at the position where the end of the steering start guide line 100 overlaps with the side frame line 35 of the parking space 33 in the neighborhood of the target point TP as shown in FIG. 6B. Under the condition that the vehicle stops at that position, when the driver steers the steering wheel 7 fully in the clockwise, the steering amount guide mark 120 is lowered up to the end of the steering start guide line 100. Under this condition, the vehicle reverses under the condition that the steering wheel 7 is kept at that steering angle. When the vehicle reverses while keeping the steering wheel 7 in that condition, the vehicle becomes parallel with the side frame line under the condition that the vehicle enters more backwardly than the vehicle position O. The vehicle is stopped at that, position and the steering wheel is turned back. Thereafter, the vehicle reverses straight so that the vehicle may be parked suitably for the parking space 33. In this case, apart of the vehicle 1 enters into the adjacent parking space sometimes but since the line segment 141 of the bumper line of the vehicle 1 is shown, it is possible to predict whether the rear bumper of the vehicle is brought into contact with the neighbor vehicles, walls or pillars.

Figure 6C:
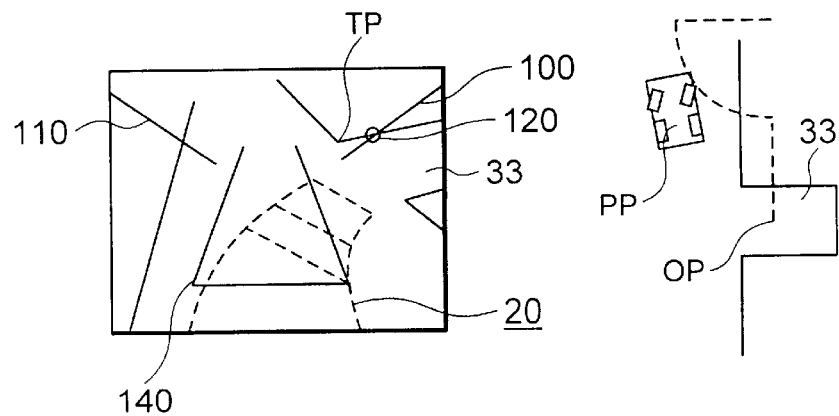

Also, in the case where the position of the vehicle 1 to be parked in parallel has an some angle to the position where the vehicle is perpendicular to the parking space 33, the driver reverses the vehicle straight, and as shown in FIG. 6C, stops the vehicle at the position where the steering start guide line 100 intersects the side frame line 35 of the parking space 33 in the neighborhood of the target point TP. Under the condition that the vehicle stops in that position, the driver steers the steering wheel 7 until the steering amount guide mark 120 overlaps with the intersection between the steering start guide line 100 and the side frame line 35. Under this condition, the vehicle reverses under the condition that the steering wheel 7 is kept at that steering angle so that the vehicle may be parked suitably for the parking space 33.

Thus, since the steering start guide line 100 and the steering amount guide mark 120 show where and how much amount the steering wheel should be steered in order to park the vehicle suitably in the parking space without any fine adjustment of the steering amount of the steering wheel while the vehicle reverses for parallel parking, it is unnecessary to finely adjust the steering amount of the steering wheel during the reverse of the vehicle. Also, since the vehicle width guide line 140 guides the position where the steering wheel 7 is to be turned back and shows the positional relation between the vehicle 1 and the rear parking frame line 36, it is possible to park the vehicle in the suitable position of the parking space 33.

Also, in the case where the vehicle 1 is to be parked in parallel to the rear left parking space 33, the left steering start guide line 110 of the image field 19 of the monitor 4 is used and if the driver steers the steering wheel 7, the steering amount guide mark 120 appears on the steering start guide line 110, and it is possible to perform the parallel parking in the substantially same steps as those of the right rear parallel parking described above.

The representation method of each guide display may be modified so as to be easier for the driver. For instance, it is possible to change the color of each guide display. Also, it is not necessary to limit the shape of the steering amount guide mark 120 to a circle but it is possible to represent it with a triangle, a rectangle, a star-shape or the like. Furthermore, it is possible to let the steering amount guide mark 120 blink. It is possible to turn off one of the steering start guide lines 100 and 110 which is unnecessary in accordance with the steering direction of the steering wheel.

Also, with respect to the target point TP, it is possible to set the target point TP for various positions. It is possible to set the target point TP at the end of the closer side frame line 35 of the parking space 33 to the vehicle. Furthermore, if both the close side and remote side of the side frame lines 35 are used as the target points, it is possible to confirm whether the positional relationship between the parking space 33 and the position of the vehicle 1 before the parallel parking is at a right angle. Also, thus, it is possible to use the center of the parking space 33 as the target. Therefore, even if the width WP of the parking space 33 is different from that the set value, it is possible to park the vehicle to the center of the parking space 33.

Second Embodiment

A steering assist apparatus in accordance with a second embodiment is used to support the steering operation when the vehicle is to be parked in line and has the same structure as that of the steering assist apparatus in accordance with the first embodiment shown in FIG. 2. However, the display data for the in-line parking and the controlling program for the in-line parking are stored in the ROM 14.

The display data of the fixed guide display shown in a fixed manner which is in a predetermined position irrespective of the steering operation of the steering wheel 7 on the image field 19 of the monitor 4 is stored in the ROM 14. The fixed guide display has a pair of vehicle width guide lines 40 and 41 for representing the predicted position of both side portions of the vehicle 1 when the vehicle 1 reverses straight as indicated by the solid lines in FIG. 7A, and has circular eye marks 42 and 43 disposed, respectively, at the rear end portions of the vehicle width guide lines 40 and 41 on the image field 19 representing the upper end portions of the these vehicle width guide lines 40 and 41, i.e., the image of the rear view. Also, the fixed guide display has a pair of steering start guide lines 44 and 45 disposed symmetrically on the right and left sides of the upper portion in the image field 19. The steering start guide lines 44 and 45 show the timing when the steering operation is started for the in-line parking of the vehicle 1 that reverses straightly in parallel with the road and are depicted as line segments having a predetermined length.

The CPU 13 operates on the basis of the controlling program stored in the ROM 14. When the CPU 13 detects through the rear position switch 10 that the shift lever 5 is switched to the reverse position, the CPU 13 calculates the predicted locus of the vehicle 1 reversing at the steering angle α at that time from the output signal of the steering angle calculation section 12 and produces periodically the display data for displaying the movement guide display for showing the indication of the vehicle width at the position corresponding to the steering angle α based on this predicted locus in the superimposed manner on the image of the camera 2.

Figure 7A:
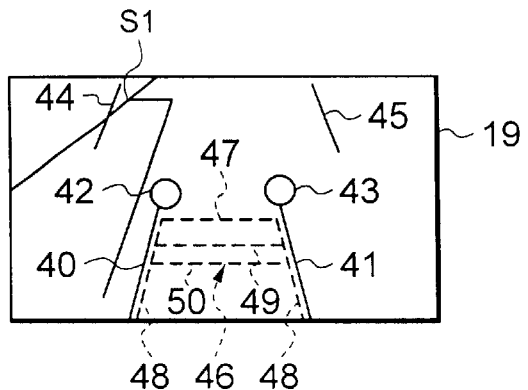
FIGS. 7A to 7E are views schematically showing, in a stepwise manner, monitor image fields in parking in line in accordance with a second embodiment, respectively.

The movement guide display 46 corresponds to the predicted locus of the vehicle reversing at the steering angle α at that time as shown by the dotted line in FIG. 7A and has a line segment 47 having a length of the vehicle width at the position of substantially the wheel base length from the rear end of the vehicle in the image field 19 of the monitor 4, a pair of side lines 48 extended toward the rear end of the vehicle from both ends of the line segment 47 keeping the interval of the vehicle width, and a pair of line segments 49 and 50 extended in the vehicle width direction showing the middle portion of the vehicle. The movement guide display 46 moves so as to be curved to the fright and left directions as indicated by, for example, the dotted line in FIG. 7C in response to the steering operation of the steering wheel 7.

Figure 7B:
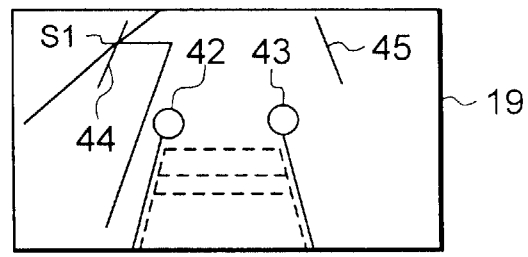
Figure 7C:
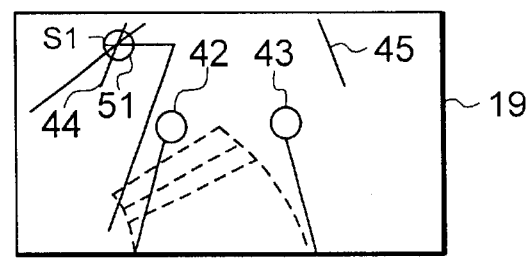
Figure 7D:
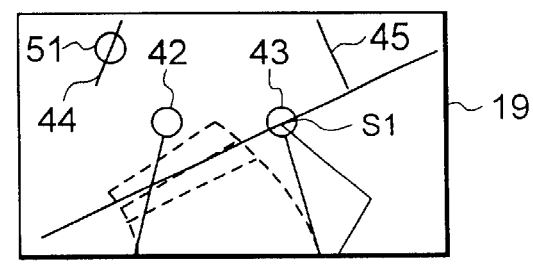
Figure 7E:
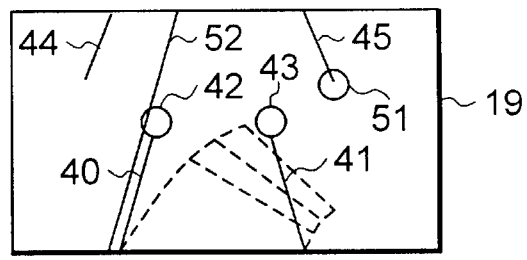

Furthermore, the CPU 13 produces periodically the display data of the circular steering amount guide mark 51 that moves along the steering start guide lines 44 and 45 in the image field 19 of the monitor 4 in response to the steering angle α at that time and is displayed in the superimposed manner on the image of the camera 2, based on the output signal of the steering angle calculation section 12. When the steering wheel 7 turns counterclockwise, for example, as shown in FIG. 7C, the steering guide mark 51 is moved and displayed on the steering start guide line 44 on the left side of the image field. On the other hand, when the steering wheel 7 turns clockwise, as shown in FIG. 7E, the steering amount guide mark 51 is moved and displayed on the steering start guide line 45 on the right side of the image field.

Figure 8:
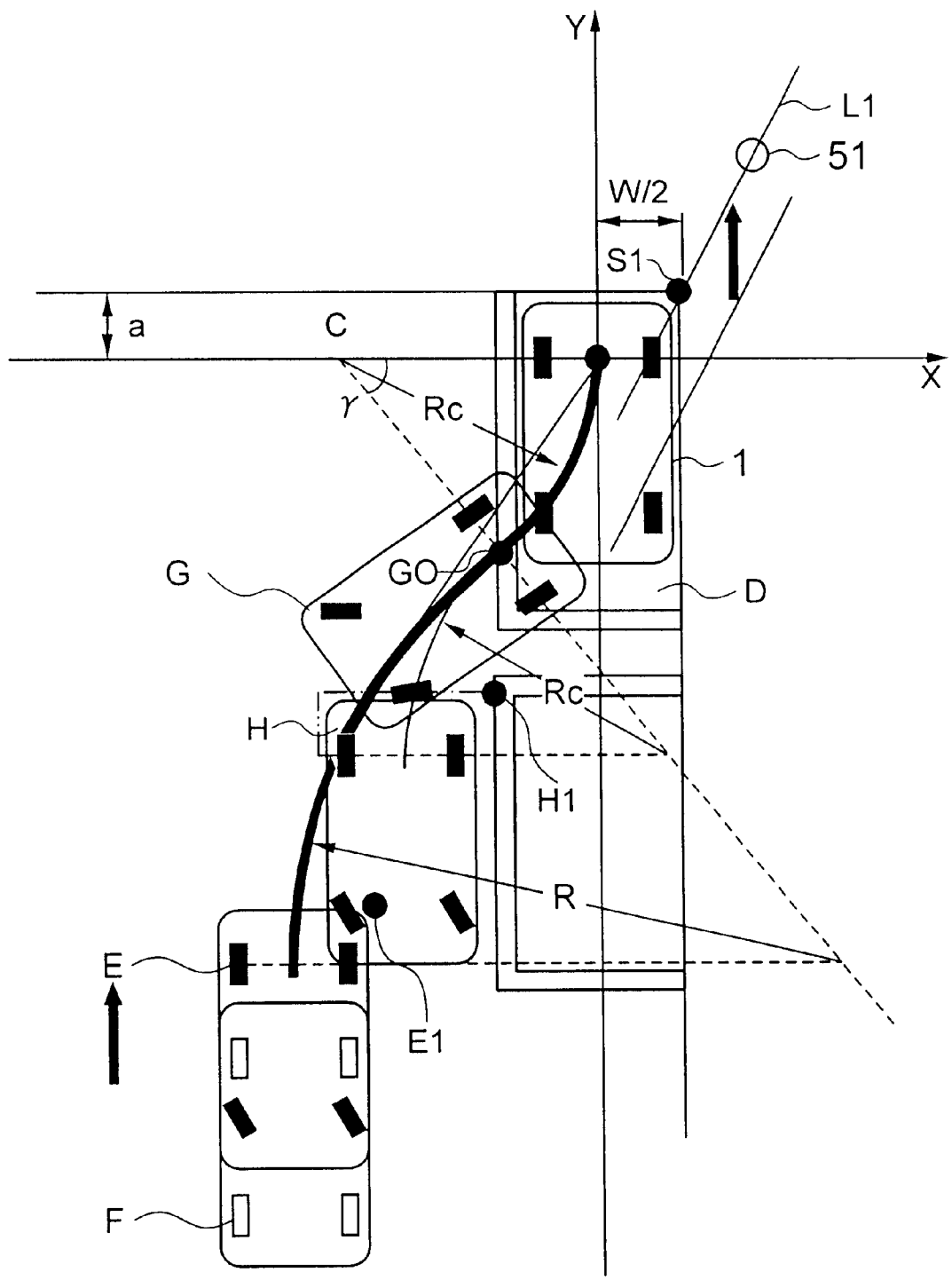
FIG. 8 is a view schematically showing, in a stepwise manner, the positions of the vehicle in parking in line in accordance with the second embodiment.

A method of depicting the steering start guide lines 44 and 45 will be described. As shown in FIG. 8, let the center of the rear axle of the vehicle 1 under the condition that the vehicle 1 is suitably parked in the parking space D be as an original point. The Y-axis is in the reverse direction of the vehicle 1 and in parallel with the road. The X-axis is perpendicular to the Y-axis. A rear corner of the parking place D is set to be as a target point S1 whose coordinate is S1(W/2, a). Here, W is the vehicle width and a is the rear overhang. It is now assumed that the vehicle 1 located in the vehicle position H reverses while rotationaling with a radius Rc with the maximum steering angle in one direction, the steering wheel 7 is turned in the opposite direction so that the steering angle is at the maximum steering angle when the vehicle 1 is in the vehicle position G, and the vehicle 1 reverses with the radius Rc under this condition so that the vehicle 1 is parked suitably in the parking space D.

An angle γ of the vehicle position G viewed from the rotational center C when the vehicle 1 reverses into the parking space D with the rotational radius Rc of the rear axle center with the maximum steering angle from the vehicle position G is given as:

$$\gamma = \cos^{-1}[(Rc-W/2)/\{(Rc+W/2)^2+a^2\}^{1/2}] - \tan^{-1}\{a/(Rc+W/2)\}$$

By using the angle γ described above, the coordinate (G0x,G0y) of the rear axle center G0 in the vehicle position G is given as follows:

$$G0x = -Rc(1-\cos\gamma)$$

$$G0y = -Rc \times \sin\gamma$$

Furthermore, using the coordinate of this rear axle center G0, the coordinate (H1x,H1y) of the point H which is the rear corner of the parking space D corresponding to the target point S1 in the case where the parking place D is assumed to be moved in parallel to the vehicle position H is given as follows:

$$H1x = -2Rc(1-\cos\gamma) + W/2$$

$$H1y = -2Rc \times \sin\gamma + a$$

Accordingly, the straight line L1 connecting the target point S1 and the point H1 is represented as follows:

$$Y = \{\sin\gamma/(1-\cos\gamma)\} \times X - \{\sin\gamma/(1-\cos\gamma)\} \times (W/2) + a$$

The target point S1 in the image field 19 of the monitor 4 corresponding to the vehicle position H is used as a start point, and the line segment extended backward from this start point along the straight line L1 becomes the steering start guide line. This steering start guide line is depicted symmetrically on the right and left sides of the Y-axis. These are used as the steering start guide lines 44 and 45.

If, in accordance with the movement of the vehicle 1, the target point S1 of the parking space D imaged on the image field 19 of the monitor 4 overlaps with the steering start guide line 44 or 45, it is possible to judge that the position is the space where the vehicle may be parked in line by the steering assist apparatus according to this invention.

A method for depicting the steering amount guide mark 51 will now be described. Consider the vehicle position E in parallel with the Y-axis from which the vehicle 1 may reach the vehicle position G by rotating backward with the radius R. The coordinate (E1x,E1y) of the point E that is the rear corner of the parking space D corresponding to the target point S1 in the case where the parking space D is assumed to be moved in parallel to the vehicle position E is given as follows:

$$E1x = -(R+Rc) \times (1-\cos\gamma) + W/2$$

$$E1y = -(R+Rc) \times \sin\gamma + a$$

By using the Y ordinate E1y, the rotational radius R is given by:

$$R = (a-E1y)/\sin\gamma - Rc$$

Then, the circular steering amount guide mark 51 that is moved along the steering start guide lines 44 and 45 in correspondence with the steering angle α of the steering wheel 7 is represented while being superimposed on the image of the camera 2. The position of the steering amount guide mark 51 is set so that the rotational radius R of the formula described above may be just obtained when the steering wheel 7 is steered so that the steering amount guide mark 51 overlaps with the target point S1 of the parking space D imaged on the image field 19 of the monitor 4.

The operation of the steering assist apparatus in the parking in line will now be described. First of all, as shown in FIG. 8, when the driver operates the shift lever 5 to the reverse position in the vehicle position F in parallel with the road, on the basis of the detection signal from the rear position switch 10, as shown in FIG. 7A, the image processing section 8 displays on the image field 19 of the monitor 4 the vehicle width guide lines 40 and 41, the eye marks 42 and 43, the steering start guide lines 44 and 45, the movement guide display 46 and the steering amount guide mark 51 in the superimposed manner on the image of the camera 2.

At this time, on the image field 19, the target point 51 of the parking space D does not overlap with the steering start guide line 44 specialized for the rear left parking.

When the vehicle 1 reverses straight and in parallel with the road, the target point S1 is gradually close to the steering start guide line 44 on the image field 19. As shown in FIG. 7B, at the time when the target point S1 overlaps with the steering start guide line 44, it is judged that the position is the vehicle position E where the parking in line is possible. Then, the vehicle 1 is stopped.

At this time, when the steering wheel 7 is turned counterclockwise, the steering amount guide mark 51 moves gradually downward from the upper portion of the image field 19 along the steering start guide line 44. Then, as shown in FIG. 7C, at the time when the steering amount guide mark 51 overlaps with the target point S1, the vehicle 1 is reversed while keeping the steering angle of the steering wheel 7. Thus, the vehicle 1 rotationals with the radius R and the target point S1 comes closer to the eye mark 43 for the left rear parking on the image field 19. As shown in FIG. 7D, when the target point S1 overlaps with the eye mark 43, it is judged that the vehicle reaches the vehicle position G and the vehicle 1 is stopped.

Subsequently, the steering angle of the steering wheel 7 is made to be maximized in the opposite direction to reverse the vehicle 1. Thus, the vehicle 1 enters the parking space D and as shown in FIG. 7E, at the time when the vehicle width guide line 40 is in parallel with the road side line 52, the vehicle 1 is stopped and the parking in line is completed.

Incidentally, in the case where the vehicle is parked in the right rear direction in the in-line manner, in the substantially same way, by using the steering start guide line 45, the eye mark 42 and the steering amount guide mark on the image field 19 for the right rear parking at the time when the vehicle guide 41 is in parallel with the road side line, the vehicle 1 may be stopped.

Also, in correspondence with the steering operation of the steering wheel, when the vehicle 1 is to be parked in the left rear side, make the color or tone of the eye mark 43 for the left rear parking same as that of the steering amount guide mark 51, and when the vehicle 1 is to be parked in the right rear side, make the color or tone of the eye mark 42 for the right rear parking same as that of the steering amount guide mark 51. Then it is possible to recognize the eye mark to be used more easily manner and to make the driving easier. For example, set the color of the steering amount guide mark 51 to be A and set the color of the eye marks 42 and 43 when the vehicle moves straight to be B, and if the steering wheel 7 is turned more than the predetermined angle to the left for the left rear parking, only the color of the eye mark 43 for the left rear parking becomes A, and if the steering wheel 7 is turned more than the predetermined angle to the right for the right rear parking, only the color of the eye mark 42 becomes A. Such a system may be adopted.

It is also possible to use a system in which, when the vehicle moves straight, the eye marks 42 and 43 are not displayed, and when the steering wheel 7 is turned more than the predetermined angles in either right or left direction, the eye marks 42 and 43 are displayed. Furthermore, it is possible to use a system in which only one of the eye marks that is used for parking in correspondence with the steering direction of the steering wheel 7 is displayed.

Incidentally, it is understood that the eye marks 42 Land 43 and the steering amount guide mark 51 are not limited to the circular shape but it is possible to use any other shape.

Also, in the embodiment described above, the rear corner of the parking space D is used as the target point S1. However, the invention is not limited to this. It is possible to use any other point only if the point is fixed to the parking space D.

Third Embodiment

Figure 9:
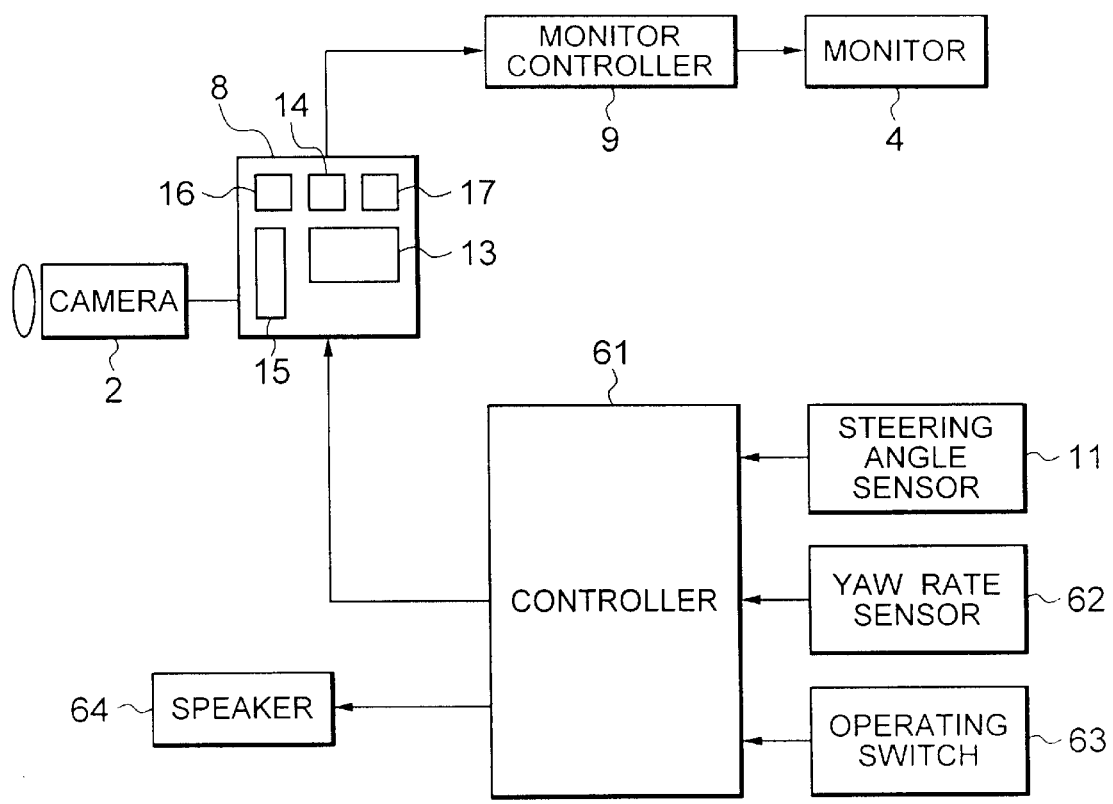
FIG. 9 is a block diagram showing a structure of a steering assist apparatus in accordance with a third embodiment.
Figure 10:
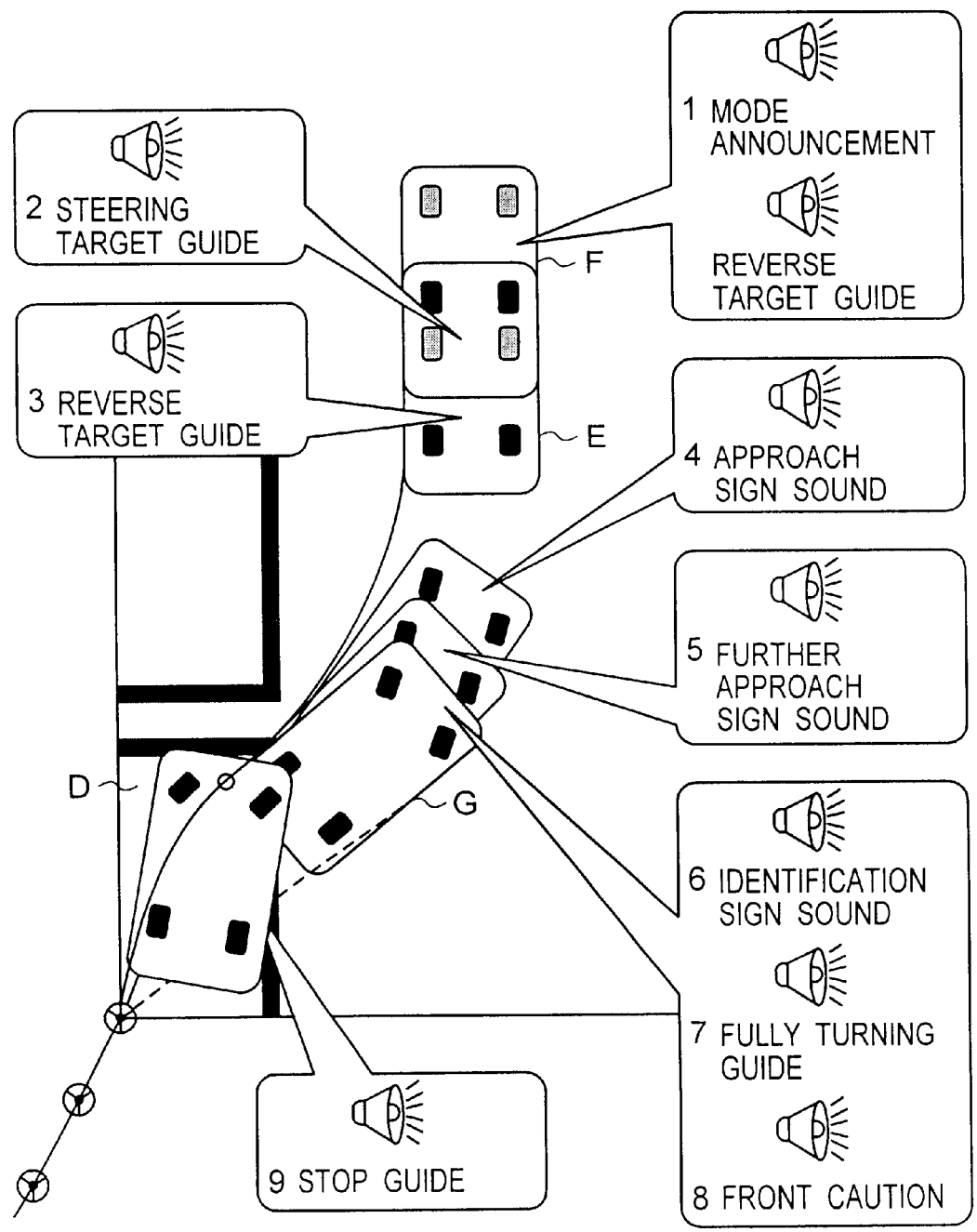
FIG. 10 is a view showing sound steering information corresponding to the positions of the vehicle in parking in line in accordance with the third embodiment.

A steering assist apparatus according to a third embodiment of the present invention assists the steering operation by using sound. FIG. 9 shows its structure. The image processing section 8 is connected to the camera 2, and the monitor 4 is connected through the monitor controller 9 to this image processing section 8. The steering angle sensor 11 for detecting the steering angle of the steering wheel 7 is mounted on the steering shaft of the steering wheel 7. This steering angle sensor 11 is connected to a controller 61. Connected to the controller 61 are a yaw rate sensor (gyro) 62 for detecting an angular velocity in a yaw angle direction of the vehicle, an operation switch 63 for setting up a zero degree position of the yaw angle of the vehicle, and a speaker 64 for guiding the steering information to the driver by sound.

The controller 61 calculates the steering angle of the front wheels from the steering angle of the steering wheel 7 detected by the steering angle sensor 11 and outputs it to the image processing section 8. The image processing section 8 is provided with the CPU 13, the ROM 14 storing the controlling program, the image processing processor 15 for processing the image data from the camera 2, the image memory 16 storing the image data processed by the image processing processor 15 and the RAM 17 for working.

In the same manner as that of the second embodiment, the controlling program and the display data for the in-line parking are stored in the ROM 14.

The operation of the steering assist apparatus in accordance with the third embodiment will now be described. Incidentally, one example of the content of the sound steering information in each step of the parking operation is shown as follows:

Step 1
   START IN-LINE PARKING—When the assist system is in the in-line parking sound guide mode,
   "This is the in-line parking mode."
   SUBSEQUENT REVERSE TARGET GUIDE
   "Please reverse the vehicle until the blue line is identified with the target point."

Step 2
   STEERING TARGET GUIDE—Steering Angle >36°
   "Please turn the steering wheel until the red mark is identified with the target point."

Step 3
   REVERSE TARGET GUIDE—Steering Angle >90°
   "Please reverse the vehicle until the yellow mark is identified with the target point."

Step 4
   APPROACH TO TARGET POINT OF EYE MARK— yaw angle >32°
   "Pong, Pong (approach announcement sound)"

Step 5
   APPROACH TO TARGET POINT OF EYE MARK— yaw angle >34°
   "Pong, Pong (further approach announcement sound)"

Step 6
   IDENTIFICATION WITH EYE MARK—yaw angle >36° [The calculating target value is 39°.]
   "Pong (identification sound)"

Step 7
   SUBSEQUENT FULL STEERING GUIDE
   "Please fully turn the steering wheel in the opposite direction."
   REVERSE GUIDE—steering angle >540° [full steering condition]

"Please reverse while paying your attention to the rear side."

Step 8

FRONT WARNING—yaw angle <20°

"Please pay your attention to the interval from the front vehicle."

Step 9

APPROACH TO PARKING COMPLETION POSITION (STOP POSITION GUIDE)—yaw angle <10°

"Please stop the vehicle while paying attention to the rear side."

First of all, when the driver operates the shift lever 5 to the reverse position, as shown in FIG. 7A, the image processing section 8 displays the vehicle width guide lines 40 and 41, the eye marks 42 and 43, the steering start guide lines 44 and 45, the movement guide display 46 and the steering amount guide mark 51 on the image field 19 of the monitor 4 superimposing on the image of the camera 2. Then, as shown in FIG. 8, the operation switch 63 is operated in the vehicle position F where the vehicle is in parallel with the road. By the operation of the operation switch 63, the controller 61 sets up the vehicle position F as the zero degree position of the vehicle yaw angle and at the same time provides the driver with the sound steering information for guiding that the assist system is in the in-line parking mode as the step 1 through the speaker 64. Subsequently, the controller 61 provides the steering information for the reverse target guide that the vehicle should be reversed until the blue line (steering start guide lines 44 and 45) are identified with the target point S1.

When the driver reverses the vehicle 1 straight in parallel with the road in accordance with the steering information described above, the target point S1 comes gradually close to the steering start guide line 44 on the image field 19. As shown in FIG. 7B, at the time when the target point S1 overlaps with the steering start guide line 44, the driver judges that the position is the vehicle position E where the vehicle 1 may be parked in the in-line manner and stops the vehicle 1.

Here, when the driver turns the steering wheel 7 counterclockwise, the steering angle is detected by the steering angle sensor 11. When the steering angle has exceeds the thirty-six degrees, the controller 61 provides as the step 2 the sound steering information for the steering target guide that the steering wheel 7 is to be turned until the red mark (steering amount guide mark 51) is identified with the target point S1. When the driver turns the steering wheel 7 in accordance with the steering information described above, the steering amount guide mark 51 gradually moves downward from the upper portion of the image field 19 along the steering start guide line 44. The driver holds the steering angle of the steering wheel 7 which the steering amount guide mark 51 overlaps with the target point S1 in accordance with the steering information described above as shown in FIG. 7C. Next, the controller 61 provides as the step 3 the sound steering information for the reverse target guide that the vehicle is to be reversed until the yellow marks (eye marks 42 and 43) are identified with the target point S1.

The driver reverses the vehicle 1 while keeping the steering angle of the steering wheel 7 in accordance with the steering information described above. Thus, the vehicle 1 circles with the radius R. The target point S1 becomes closer to the eye mark 43 for the left rear parking on the image field 19. When the vehicle 1 thus starts to rotational, the angular velocity in the yaw angle direction of the vehicle 1 is detected by the yaw rate sensor 62. That angular velocity is integrated with respect to the time so that the yaw angle, i.e., the rotational angle of the vehicle 1 from the vehicle position F as zero degree where the operation switch 63 has been operated. When the rotational angle of the vehicle 1 exceeds the thirty-two degrees, the controller 61 provides as the step 4 the approach sign sound as the steering information that the vehicle comes close to the full steering position G where the eye mark 43 overlaps with the target S1 on the image field 19. Furthermore, at the time when the rotational angle of the vehicle 1 exceeds thirty-four degrees, the controller 61 provides as the step 5 the approach sign sound as the steering information for announcing the fact that the vehicle comes closer to the full steering position G.

Here, in the third embodiment, the rotational angle of the vehicle 1 that reaches the full steering position G is set up at thirty-nine degrees. Accordingly, when the rotational angle of the vehicle exceeds thirty-six degrees before the vehicle 1 reaches the full steering position G, the controller 61 provides as the step 6 the identification sign sound as the steering information that the eye mark 43 is identified with the target point S1 on the image field 19. Then, as shown in FIG. 7D, when the target point S1 overlaps with the eye mark 43, the driver judges that the vehicle 1 reaches the vehicle position G and the vehicle 1 is stopped.

Subsequently, the controller 61 provides as the step 7 the sound steering information for the full steering guide that the steering wheel 7 should be turned fully in the opposite direction (clockwise direction). The driver reverses the vehicle 1 while turning the steering wheel 7 in the opposite direction and keeping the maximum steering angle in accordance with the steering information. At this time, if the controller 61 confirms that the steering wheel 7 is fully turned, i.e., the steering angle reaches the 540 degrees in accordance with the steering angle sensor 11, the controller 61 also provides the sound steering information for the reverse guide that the vehicle should be reversed under the condition that the steering wheel 7 is fully turned.

The driver reverses the vehicle 1 so that it enters the parking space D in accordance with such steering information. In the meanwhile, the angular velocity in the yaw angle direction of the vehicle 1 is being detected by the yaw rate sensor 62. When the rotational angle decreases down to twenty degrees, the controller 61 provides as the step 8 the sound steering information for front caution guide in view of a vehicle that has been parked on the front side or the like. Then, when the vehicle is further reversed and the rotational angle decreases down to ten degrees, the controller 61 provides as the step 9 the sound steering information for stop guide that the vehicle is close to the parking completion position, i.e., the parking space D. On the basis of the steering information, as shown in FIG. 7E, the driver stops the vehicle 1 and completes the in-line parking at the time when the vehicle width guide line 40 is in parallel with the road side line 52.

As described above, in the steering assist apparatus in accordance with the third embodiment, during the reverse operations from the step 3 to the step 6, and the reverse operations with the full steering operation from the step 7 to the step 9, the driver pays his or her attention to the sound steering information provided from the speaker 64 so that he or she does not have to continuously look at the image field 19 and may reverse the vehicle 1 while actually see the outer circumferences on both sides and front side of the vehicle 1. Also, since the driver may obtain the steering information through the sound, even beginner who is not familiar with the operation of the steering assist apparatus may park the vehicle without fail.

Incidentally, the yaw rate sensor 62, i.e., the rate gyro for detecting the angular velocity in the yaw angle direction is used as the means for detecting the yaw angle. However, instead thereof, it is possible to use a position gyro for detecting the yaw angle per se.

Also, it is possible to use the distance sensor for detecting the travel distance of the vehicle in reversing instead of the yaw rate sensor 62. In FIG. 8, the rotational angle R of the vehicle may be calculated as one inherent in the type of the vehicle if the steering angle is obtained by the steering angle sensor 11. The reverse distance detected by the distance sensor is recognized as an arcuate length with the rotational radius R. The controller 61 may calculate the yaw angle, i.e., the rotational angle of the vehicle in accordance with the rotational angle R and the arcuate length.

Furthermore, it is possible to apply the steering assist apparatus in accordance with the third embodiment to the steering assist for the parallel parking. Namely, it is possible to set up as the completion position of the parallel parking the rotational position that has been changed by ninety degrees in yaw angle of the vehicle from the zero position of the vehicle yaw angle in which the operation switch 63 is operated, in order to provide various steering information to the driver.

Figure 11:
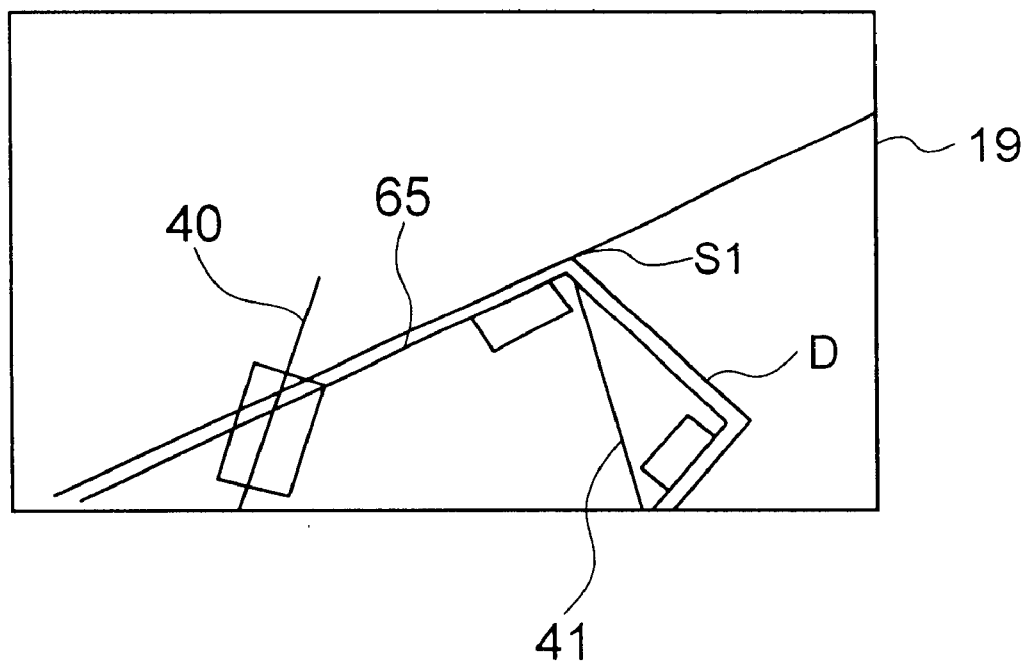
FIG. 11 is a view showing a monitor image field in accordance with a modification of the third embodiment.

Also in the third embodiment described above, instead of the eye marks 42 and 43, it is possible to use the vehicle mark 65 shown in FIG. 11. The vehicle mark 65 is a display showing schematically the plan view of the vehicle and a display whose its position and size are not changed in the monitor image field 19. Then, the shape of the vehicle mark 65 is a shape which just overlaps with the line representing the parking space D in the vehicle rear images displayed on the monitor image field 19 when the vehicle reaches the full steering position G. The driver steers the steering wheel 7 until the steering amount guide mark 51 overlaps with the target point S1 as shown in FIG. 7C in accordance with the sound information of the step 2 and reverse the vehicle while keeping the steering angle. The controller 61 obviates the display of the steering guide mark 51 and the steering start guide lines 44 and 45 as shown in FIG. 11 at the time when the rotational angle of the vehicle detected by the yaw rate sensor 62 exceeds thirty-two degrees. The vehicle mark 65 is displayed on the monitor image field 19. Also, the sound information for guiding that the vehicle is reversed so hat the vehicle mark 65 overlaps with the line representing the parking space D is provided as the sound information that is similar to the sound information of the step 3 described above. When the vehicle mark 65 overlaps with the line representing the parking space D on the monitor image field 19, the driver may recognize that the vehicle is in the full steering position. In addition, the vehicle mark 65 has a shape that simulates the vehicle and the display overlaps with the line representing the parking space D. Accordingly, it is easy for the driver to recognize in intuitively manner the fact that the vehicle reaches the full steering position. Also, since the vehicle mark 65 is not always displayed but is displayed only when it is necessary on the basis of the rotational angle of the vehicle detected by the yaw rate sensor 62, although this is a large size display that simulates the vehicle, there is no fear that the monitor image could hardly be seen.

Also, in the third embodiment, the voice is used as the steering information. However, the steering information is not limited to this but any audio information like the signal tone may be used, and it is possible to use the sensitive information such as vibration transmitted through the steering wheel or the like. Also, it is possible to make a part or all of the guide display on the monitor image field blink, to change the colors, to provide the visual information simultaneously, for example, by changing the size, or to display the messages of the content of the operation to be performed next by the driver on the monitor image field.

Fourth Embodiment

In the foregoing first to third embodiments, an image behind the vehicle is picked up by means of a camera 2 and the image is superimposed on a monitor 4 together with a fixed display guide, a movement display guide and the like. However, in this fourth embodiment, the system relates to a steering assist apparatus without using any camera 2 or monitor 4.

Figure 12:
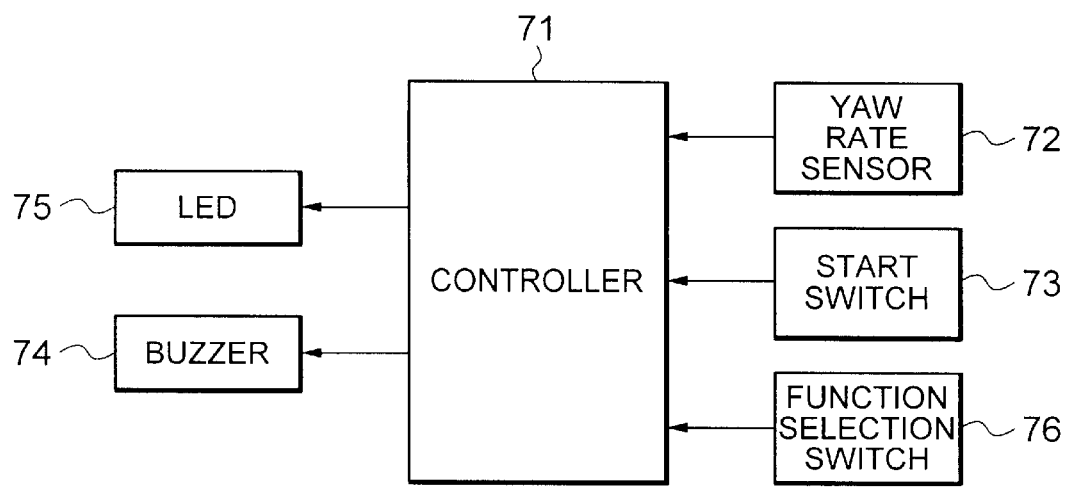
FIG. 12 is a block diagram showing a structure of the steering assist apparatus in accordance with the fourth embodiment of thee present invention.

FIG. 12 shows a structure of the steering assist apparatus in accordance with the fourth embodiment of the present invention. Connected to a controller 71 are a yaw rate sensor 72 for detecting an angular velocity in a yaw angle direction of the vehicle, a function selection switch 76 for informing the controller 71 whether the vehicle is to be parked in a parallel manner or in an in-line manner, and a start switch 73 for informing the controller 71 that the parking operation of the vehicle is to be started so that the controller 71 sets a zero position of a yaw angle. Furthermore, a buzzer 74 for giving steering information to the driver by sound and an LED 75 for giving the steering information to the driver visually are connected thereto.

The controller 71 is provided with a CPU, a ROM storing a control program and a working RAM which are not shown in the drawing.

Data of a minimum swivel radius Rc in the case where the steering wheel 7 is fully turned at maximum and the vehicle swivels are stored in the ROM. The CPU operates in accordance with the control program stored in the ROM. The controller 71 calculates the yaw angle of the vehicle from the angular velocity of the vehicle inputted from the yaw rate sensor 72, calculates the swivel angle of the vehicle and outputs to the buzzer 74 and the LED 75 the information relating the operating timing and the operating method in each step during the parking driving.

The assisting operation of the steering assist apparatus according to this fourth embodiment as to what kind of locus of the vehicle is drawn will now be described.

First of all, with referring to FIG. 13, the parallel parking will now be described.

While letting as an original point OO be the center point of the entrance of a parking space D where the vehicle 1 is to be parked, a Y-axis is taken in a back-up direction of the vehicle 1 in the parking space D perpendicular to the road and an X-axis is taken in parallel with the road, i.e., perpendicular to the Y-axis. Also, W1 is the width of the parking frame of the parking space D. The steering assist apparatus assists the driver so that the vehicle 1 is parked appropriately in a vehicle parking position H3 where a rear axle center H2 comes to the center in the width direction of the parking space D and the vehicle 1 is in parallel with a longitudinal direction of the parking space D.

First of all, assume that the vehicle 1 is parked as the initial stop position in a vehicle position E3 where the rear axle center E2 of the vehicle 1 perpendicular to the parking space D is kept at a distance LD from the inlet of the parking space D and a side portion D1 of the parking space D and a position of the driver DR of the vehicle 1 are identified with each other.

Subsequently, the vehicle 1 in the vehicle position E3 is advanced up to the swivel angle θ while swiveling at the radius Rc and keeping the steering angle of the steering wheel 7 at maximum in the left direction and comes in the vehicle position F3. At this point, the vehicle is reversed through a swivel angle φ while the steering angle of the steering wheel 7 is kept at maximum in the right direction and the vehicle is swiveled at the swivel radius Rc. The steering wheel 7 is returned back to the straight advance condition in the vehicle position G3 where the vehicle 1 is in parallel with the parking space D, and furthermore, the vehicle is reversed so as to be parked suitably in the vehicle position H3 within the parking space D.

Also, the rear axle centers in the vehicle positions E3, F3 and G3 are represented by E2, F2 and G2, respectively.

Here, let that the distance in the X-axis direction between the driver's position DR in the vehicle position E3 and the rear axle center E2 be LL, and the coordinate (C1x, C1y) of the swivel center C1 when the vehicle 1 swivels from the vehicle position E3 to the vehicle position F3 is given as follows:

$$C1x = LL - W1/2$$

$$C1y = -(LD + Rc)$$

The coordinate of the swivel center C2 (C2x, C2y) when the vehicle 1 swivels from the vehicle position F3 to the vehicle position G3 is also given as follows:

$$C2x = -(Rc+Rc)\cdot\sin\theta + C1x = -2Rc\cdot\sin\theta + LL - W1/2$$

$$C2y = (Rc+Rc)\cdot\cos\theta + C1y = 2Rc\cdot\cos\theta - (LD+Rc)$$

Out of these, the X coordinate C2x is also given as follows:

$$C2x = -Rc$$

From the two equations of the X coordinate C2x, sin θ is given as follows:

$$\sin\theta = (Rc + LL - W1/2)/2Rc$$

This value θ may be calculated from the known Rc, LL and W1. This value is stored as the set value θ in the controller 71.

Furthermore, the swivel angle φ when the vehicle 1 swivels from the vehicle position F3 to the vehicle position G3 is given as follows:

$$\phi = \pi/2 - \theta$$

The operation of the steering assist apparatus according to the embodiment 4 will now be described.

First of all, the driver stops the vehicle 1 in the vehicle position E3 to operate the function selection switch 76 in order to select the parallel parking. The program for the parallel parking is run by the controller 71 in accordance with the operation of the function selection switch 76. Furthermore, when the driver operates the start switch 73, the controller 71 sets the vehicle position E3 to be the zero position of the yaw angle of the vehicle. Subsequently, the driver steers the steering wheel 7 at maximum in the left direction and advance the vehicle 1 intactly.

The controller 71 calculates the yaw angle from the angular velocity of the vehicle 1 that is inputted from the yaw rate sensor 72 and compares the yaw angle with the set value θ. When the vehicle 1 is close from the vehicle position E3 to the vehicle position F3, the controller 71 informs the driver based on the difference between the yaw angle and the set value θ of, as the steering information, the approach information that the vehicle approaches the vehicle position F3 and the reach information that the vehicle reaches the vehicle position F3 through the buzzer 74 and the LED 75.

For instance, the buzzer 74 generates intermittent sound like "pi, pi" as the approach information and the LED 75 is flashes. The cycle of the intermittent sound and the flash is shortened in accordance with the reduction in the difference between the yaw angle and the set value θ. When the yaw angle and the set value θ agrees with each other, the continuous sound like "pee" is generated from the buzzer 74 as the reach information, and at the same time, the LED 75 lights.

The driver stops the vehicle 1 in the vehicle position F3 in accordance with the reach information. Subsequently, the driver manipulates the steering wheel 7 at maximum in the right direction to bring the steering wheel into a fully steered condition. The vehicle 1 is reversed intactly. The driver stops the vehicle 1 in the vehicle position G3 where the vehicle is kept in parallel with the parking space D. In the vehicle position G3, the driver return the steering wheel back to the straight advance position and thereafter reverses the vehicle 1 to complete the parking when the vehicle 1 is within the parking space D.

Upon the completion of parking, since the yaw angle of the vehicle 1 is set at about 90° to the vehicle position E3, it is possible to inform the driver of the parking completion information on the basis of the yaw angle of the vehicle 1.

Subsequently, the case where the in-line parking is to be performed will now be described with referring to FIG. 14.

The vehicle 1 is to be parked in the parking space D so that a rear left end of the vehicle 1 is identified with a corner S2 that is on the deep side of the parking space D. Let that the rear axle center M2 of the vehicle 1 in the vehicle position M3 in this condition be an original point, a Y-axis is taken in the reverse direction of the vehicle 1 in parallel with the road and an X-axis is taken perpendicular to the Y-axis. Also, the coordinate of the deep corner of the parking space D is represented by S2 (W2/2, a2). The rear overhang and vehicle width of the vehicle 1 are represented by a2 and W2, respectively.

Consider that the vehicle 1 in the vehicle position J3 is advanced while swiveling at a radius Rc with the steering angle of thee steering wheel 7 at maximum in the right direction to the vehicle position K3, that the vehicle is reversed while swiveling at the radius Rc with the steering angle at maximum in the left direction, and that in the vehicle position L3 the vehicle is reversed while swiveling at the radius Rc with the steering angle at maximum in the right direction so that the vehicle is parked suitably in the vehicle position M3 within the parking space D.

First of all, the in-line parking is started with the vehicle position J3 as the initial stop position where the vehicle 1 is stopped in front of the parking space D referring to the already parked vehicle 91.

The vehicle position J3 is the position where the Y ordinate of the driver's position DR of the vehicle 1 is identified with the Y ordinate of the rear end 91a of the vehicle 91 that is parked and the vehicle is in parallel with the parking space D with the vehicle 1 and the vehicle 91 at a predetermined distance d. Accordingly, the coordinate (J2x, J2y) of the rear axle center J2 of the vehicle position J3 is determined uniquely from the relationship among the coordinate of the rear end portion 91a of the vehicle 91, the relationship between the driver's position DR and the rear axle center J2 and the vehicle distanced.

The vehicle 1 located in the vehicle position J3 is advanced up to the vehicle position K3 while swiveling at the radius Rc with the steering wheel 7 at maximum in the right direction. In this case, the swivel center is represented by C3 and the swivel angle is represent by β. Also, the vehicle 1 located in the vehicle position K3 is reversed to the vehicle position L3 while swiveling at the radius Rc with the steering angle at maximum in the left direction. In this case, the swivel center is represented by C4 and the swivel angle is represented by δ. Furthermore, the steering wheel 7 is switched in the opposite direction in the vehicle position L3, and the vehicle is reversed to the vehicle position M3 while swiveling at the radius Rc with the steering angle at maximum in the right direction. In this case the swivel center is represented by C5 and the swivel angle is represent by α.

Also, the rear axle center in the vehicle position K3 and L3 are represented by K2 and L2, respectively.

The swivel angles α, β and δ are in the following relationship:

$$δ = α - β$$

The coordinate (C5x, C5y) of the swivel center C5 is represented by:

$$C5x = -Rc$$
$$C5y = 0$$

The coordinate (C4x, C4y) of the swivel center C4 is represented by:

$$C4x = C5x + (Rc+Rc) \cdot \cos α = 31 Rc + 2Rc \cdot \cos α$$
$$C4y = C5y - (Rc+Rc) \cdot \sin α = -2Rc \cdot \sin α$$

The coordinate (C3x, C3y) of the swivel center C3 is represented by:

$$C3x = C4x - (Rc+Rc) \cdot \cos β = -Rc + 2Rc \cdot \cos α - 2Rc \cdot \cos β$$
$$C3y = C4y + (Rc+Rc) \cdot \sin β = -2Rc \cdot \sin α + 2Rc \cdot \sin β$$

Also, the coordinate of the rear axle center J2 in the vehicle position J3 is given as follows:

$$J2x = -Rc \cdot (1-\cos α) - Rc \cdot (1-\cos α - 1 + \cos β) + Rc \cdot (1-\cos β) = 2Rc \cdot (\cos α - \cos β) \quad (1)$$

$$J2y = -Rc \sin α - Rc \cdot (\sin α - \sin β) + Rc \cdot \sin β = 2Rc \cdot (\sin β - \sin α) \quad (2)$$

Here, converting the equations (1) and (2) by using formulae of the trigonometric functions, the following relationships are given:

$$\tan(α/2 + β/2) = -J2x/J2y$$
$$\sin^2(α/2 - β/2) = (J2x^2 + J2y^2)/(16Rc^2)$$

Thus, α and β may be calculated by using the coordinate (J2x, J2y) of the known rear axle center J2, and these values are stored as α and β in the controller 71.

For instance, J2x=2.3 m and J2y=4.5 m are selected for the coordinate (J2x, J2y) of the rear axle center J2 with which the vehicle may be parked without any difficulty behind the vehicle 91.

It is preferable to set the values of the coordinates J2x and J2y of the rear axle center J2 according to the size of the vehicle 1, the steering characteristics and the like.

The operation of the steering assist apparatus for the in-line parking according to this fourth embodiment will now be described.

First of all, the driver stops the vehicle in the vehicle position J3 so that the Y ordinate of the driver's position DR is identified with the Y ordinate of the rear end 91a of the vehicle 91 that parks with the distanced between the vehicle 1 and the vehicle 91. When the function selection switch 76 is operated in order to select the in-line parking, the controller 71 runs the program for the in-line parking. Furthermore, when the driver operates the start switch 73, the controller 71 set the vehicle position J3 to be the zero position of the yaw angle of the vehicle. Subsequently, the driver steers the steering wheel 7 at maximum in the right direction to hold the fully steered condition and advances the vehicle 1 intact. The controller 71 calculates the yaw angle of the vehicle from the angular velocity of the Vehicle 1 inputted from the yaw rate sensor 72 and compares the yaw angle with the set value β. As the vehicle 1 is close from the vehicle position J3 to the vehicle position K3, in the same manner as in the parallel parking, on the basis of the difference between the yaw angle and the set value β, the controller 71 informs the driver of the approach information that the vehicle approaches the vehicle position K3 and the reach information that the vehicle reaches the vehicle position K3 through the buzzer 74 and the LED 75.

The driver stops the vehicle 1 in the vehicle position K3 in accordance with the reach information. Subsequently, the driver steers the steering wheel 7 at maximum in the left direction in the fully steered condition and reverses the vehicle 1 intact. The controller 71 compares the yaw angle of the vehicle with the set value of α (=β+δ). As the vehicle 1 is close to the vehicle position L3 from the vehicle position K3, i.e., as the yaw angle of the vehicle is close to the set value α, in the same manner as in the parallel parking, on the basis of the difference between the yaw angle and the set value, the controller 71 informs, through the buzzer 74 and the LED 75, the driver of the information that the vehicle approaches the vehicle position L3 and the reach information that the vehicle reaches the vehicle position L3.

The driver stops the vehicle 1 in the vehicle position L3 in accordance with the reach information. Subsequently, the driver switch the steering wheel 7 in the vehicle position L3 in the opposite direction to the fully steered condition and reverses the vehicle 1 intactly. The driver stops the vehicle 1 in the vehicle position M3 where the vehicle 1 is in parallel with the parking space D to thereby complete the parking.

Since upon the completion of the parking, the yaw angle of the vehicle 1 is substantially zero degree to the vehicle position J3, it is possible to inform the driver of the parking completion information on the basis of the yaw angle of the vehicle 1 to the vehicle position J3.

As described above, in the steering assist apparatus according to this fourth embodiment, the camera 2 or the monitor 4 are not necessitated, and it is possible to perform the suitable steering assist even for the vehicle that is not provided with any navigation system or camera 2 or the like.

Incidentally, in this fourth embodiment, the yaw rate sensor is used for detecting the yaw angle. It is however possible to take a method in which a means for detecting the yaw angle includes a position gyro or a method in which rotationalسensors are installed on the right and left wheels, so that the yaw angle is detected from the rotational difference therebetween. Furthermore, it is possible to take a method utilizing an earth magnetic sensor or a GPS system.

The means for informing the driver of the approach information or the reach information is not limited to the LED 75 or the buzzer 74. It is possible to use an LCD, a lamp or the like, or to display the information of letters or marks on a display. Also, it is possible to utilize the audio or sound information or the vibration that may be transmitted through the steering wheel. Furthermore, the approach information or the reach information may be realized by changing the volume of sound or tone of the buzzer 74 or the flashing cycle of the LED 75 for each vehicle position that is the target for the approach or reach.

Also, instead of the function selection switch and the start switch, a structure provided with a in-line parking start switch and a parallel parking start switch may be used. In this case, the start switch corresponding to the mode of the parking is pressed to start the parking operation.

Furthermore, instead of the operation of the start switch 73, the voice of the driver is recognized by the controller so that the start of the parking operation is inputted to the controller.

Also, the steering operation for parking is not limited to the fully steered condition but a steering angle sensor is provided to inform the driver of the steering angle so that the driver may hold the steering wheel while holding the steering wheel at a predetermined steering angle.

Fifth Embodiment

In the fourth embodiment, the set value $\theta$ for the parallel parking and the set values $\alpha$ and $\beta$ for the in-line parking are stored in the ROM of the controller 71 by the controller 71 on the basis of the initial stop position for starting the predetermined parking mode. However, in the embodiment 5, the driver may set the initial stop position to a desired position. Namely, the driver may change the set values $\theta$, $\alpha$ and $\beta$ which are set in advance and may reset these values to the controller.

Figure 15:
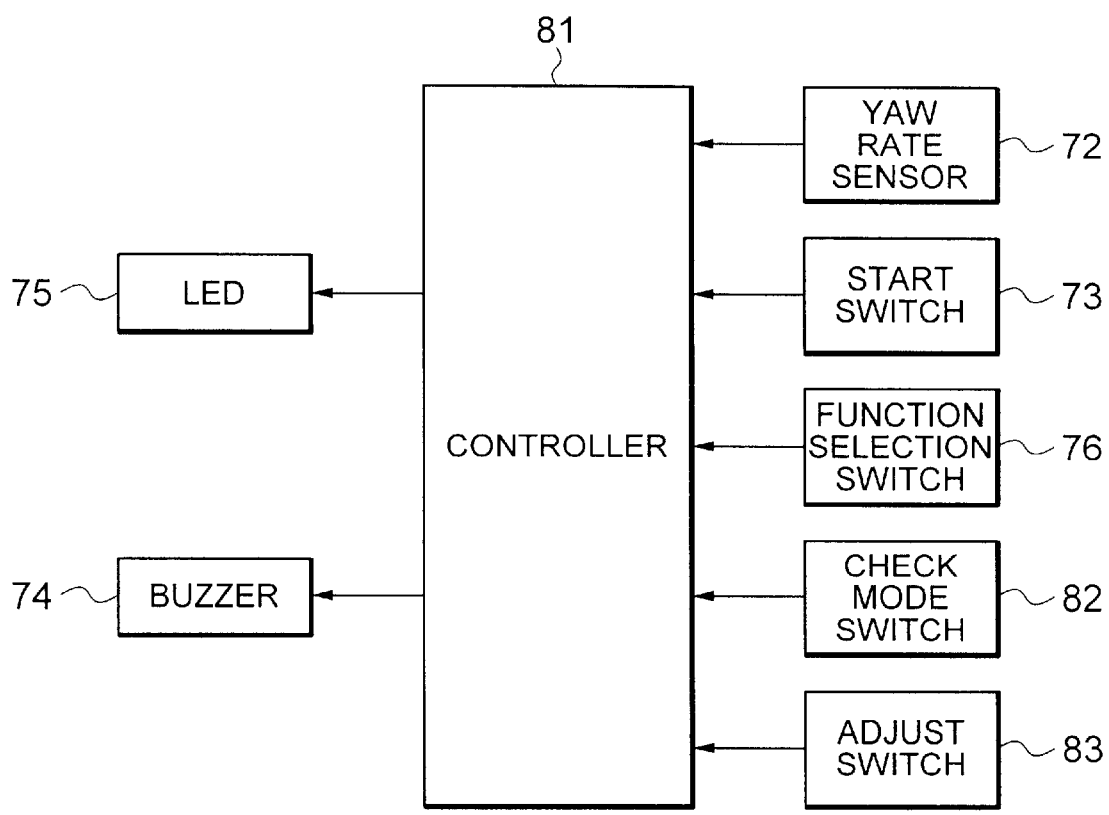
FIG. 15 is a block diagram showing a structure of the steering assist apparatus in accordance with the fifth embodiment of the present invention.

FIG. 15 shows a structure of the steering assist apparatus in accordance with this fifth embodiment.

In the structure of this steering assist apparatus, a check mode switch 82 and an adjust switch 83 are added to the apparatus according to the fourth embodiment shown in FIG. 12, and a controller 81 is provided instead of the controller 71. The check mode switch 82 and the adjust switch 83 are connected to the controller 81.

Incidentally, the adjust switch 83 may be operated in two directions as in a seesaw switch and may modify the values $\theta$, $\alpha$ and $\beta$ and reset them in the controller 81 in accordance with the amount of operation.

Figure 13:
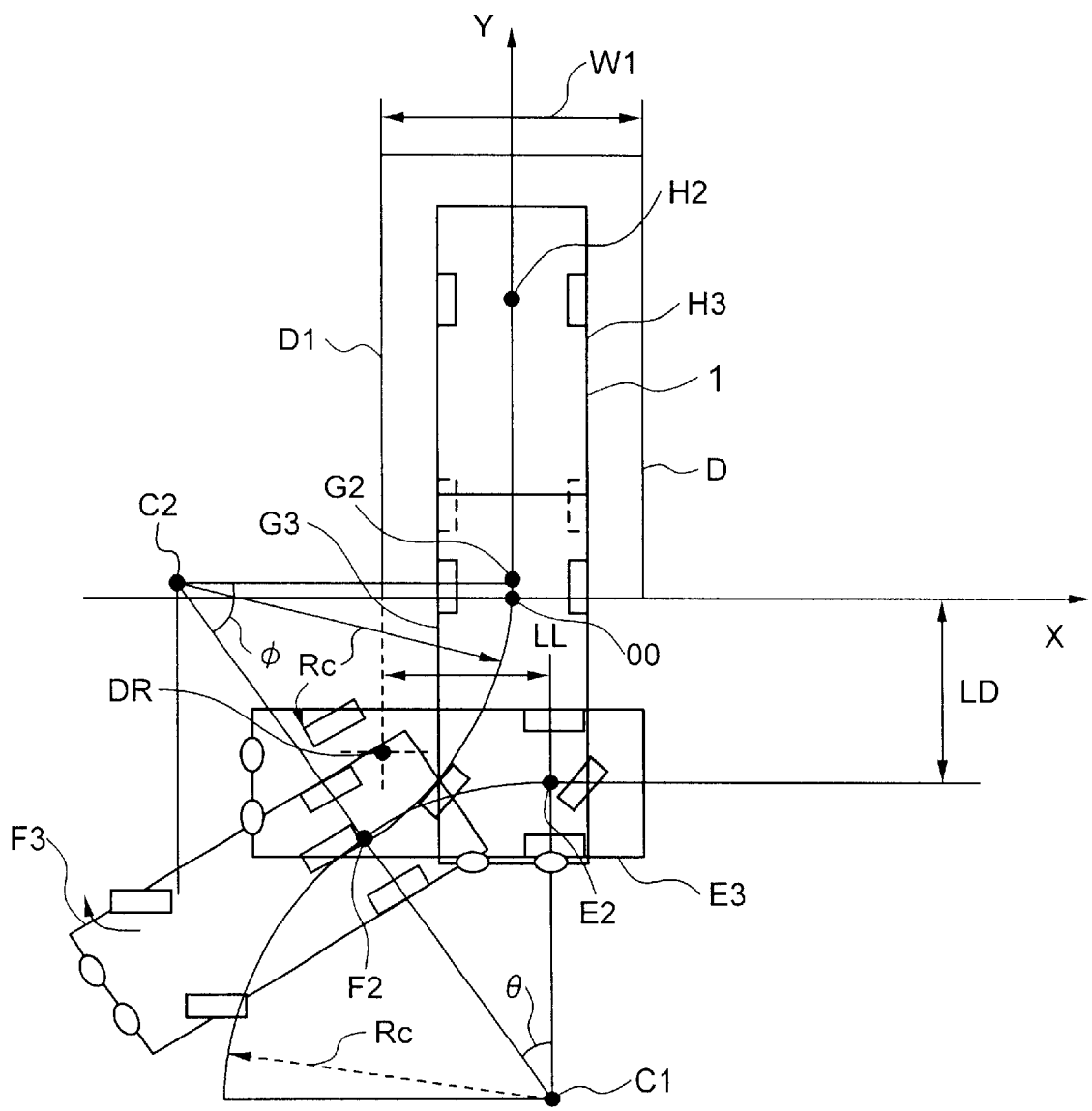
FIG. 13 is a view schematically showing, in a stepwise manner, the positions of the vehicle in parking in parallel in accordance with the fourth embodiment.

It is described how the set value $\theta$ used for the parallel parking determined in advance in the controller 81 is modified and reset by the steering assist apparatus in accordance with this fifth embodiment with referring to FIG. 13.

First of all, the vehicle 1 is stopped in a suitable vehicle position H3 within the parking space D by the driver. The vehicle is advanced straight through a suitable distance and stopped in a suitable position in the neighborhood of the vehicle position G3. Then, the driver operates the check mode switch 82 and at the same time operates the function selection switch 76 for selecting the parallel parking. The controller 81 runs the program of the check mode by the operation of the check mode switch 82 and controls the reset of the set value $\theta$ for the parallel parking. Furthermore, the controller 81 sets this vehicle position to be the zero position of the yaw angle of zero degree by the operation of the start switch 73. Subsequently, the driver steers the steering wheel 7 at maximum in the right direction in the fully steered condition and advances the vehicle 1 intact. The controller 81 calculates the yaw angle and compares the yaw angle with the value $\phi$ obtained by subtracting the set value $\theta$ from the angle $\pi/2$. As the vehicle 1 is close to the vehicle position F3, on the basis of the difference between the yaw angle and the value $\phi$, the controller 81 informs the driver of the approach information that the difference between the yaw angle and the value $\phi$ is close to zero and the reach information that the difference between the yaw angle and the value $\phi$ is zero, through the buzzer 74 and the LED 75.

The driver stops the vehicle 1 in accordance with the reach information. Subsequently, the driver steers the steering wheel 7 at maximum in the right direction to be in the fully steered condition and reverses the vehicle 1 intactly. The driver stops the vehicle 1 when the vehicle is vertical to the parking space D.

If the vehicle stop position is identified with the vehicle position E3, it is unnecessary for the driver to adjust the set value $\theta$. However, in the case where the vehicle stop position is forward of the vehicle position E3, if the driver operates the adjust switch 83 in one direction, a signal for correcting the set value $\theta$ to larger one is inputted into the controller 81. On the other hand, in the case where the vehicle stop position is rearward of the vehicle position E3, if the driver operates the adjust switch 83 in the other direction, a signal for correcting the set value $\theta$ to smaller one is inputted into the controller 81.

Thus, it is possible to correct the set value $\theta$ for the parallel parking and reset it to the controller 81.

The driver releases the operation of the check mode switch 82. The parallel parking is performed in accordance with the operating method shown in the embodiment 5, so that it is possible to make a decision whether the value $\theta$ that has been reset is suitable or not.

It will be described how the set values $\alpha$ and $\beta$ that are used for in-line parking are corrected and reset by the controller 81 with referring to FIG. 14.

First of all, the driver stops the vehicle 1 at a suitable vehicle stop position in the neighborhood of the vehicle position M3 within the parking space D. The driver operates the check mode switch 82. At the same time, the function selection switch 76 is operated in order to select the in-line parking. The controller 81 runs the program of the check mode by the operation of the check mode switch 82 and performs the control for resetting the values $\alpha$ and $\beta$ for in-line parking by the operation of the function selection switch 76. Furthermore, the controller 81 set this vehicle position to be the zero position of the yaw angle by the operation of the start switch 73. The driver steers the steering wheel 7 at maximum in the right direction to be in the fully steered condition and advances the vehicle 1 straight. The controller 81 calculates the yaw angle and compares the set value $\alpha$ with the yaw angle. As the vehicle 1 is advanced and close to the vehicle position L3, the controller 81 informs the driver of the approach information that the difference between the yaw angle and $\alpha$ approaches zero and the reach information that the difference between the yaw angle and $\alpha$ reaches zero through the buzzer 74 and the LED 75.

The driver stops the vehicle 1 in the neighborhood of the vehicle position L3 in accordance with the reach information. Subsequently, The driver steers the steering wheel 7 at maximum in the left direction to be in the fully steered condition and advances the vehicle 1 intactly. As the vehicle 1 is advanced and close to the vehicle position K3, the controller 81 informs the driver of the approach information that the yaw angle is close to $\beta$ ($=\alpha-\delta$) and the reach information that the yaw angle reaches $\beta$ through the buzzer 74 and the LED 75.

The driver stops the vehicle 1 in the neighborhood of the vehicle stop position K3 in accordance with the reach information. Furthermore, The driver steers the steering wheel 7 at maximum in the right direction to be in the fully steered condition and reverses the vehicle 1 intact. When the vehicle is parallel with the parking space D, the vehicle 1 is stopped. If this vehicle stop position is identified with the vehicle position J3, it is unnecessary for the driver to adjust the set values α and β. However, in the case where the vehicle stop position is different from the vehicle position J3, the driver operates the adjust switch 83 to adjust α and β.

Thus, the values α and β are corrected for the in-line parking, and it is possible to reset them in the controller 81.

As described above, since the driver may correct and reset the set the value θ for the parallel parking and the values α and β for the in-line parking, it is possible to perform the steering assist suitably in response to the difference of the vehicles or in correspondence with the circumferential environment.

Also, it is unnecessary to manufacture different controllers for the difference of the vehicles. It is possible to prevent the increase of the parts. At the same time, the management of the parts is facilitated. Thus, the parts cost may be reduced.

Incidentally, in this fifth embodiment, the check mode switch 82 is provided separately from the start switch 73. However, the check mode switch 82 may not be provided if the controller 81 causes to start up the program of the check mode when the start switch 73 operates continuously for three seconds. Such a structure is adopted to omit with the check mode switch 82.

Sixth Embodiment

Figure 14:
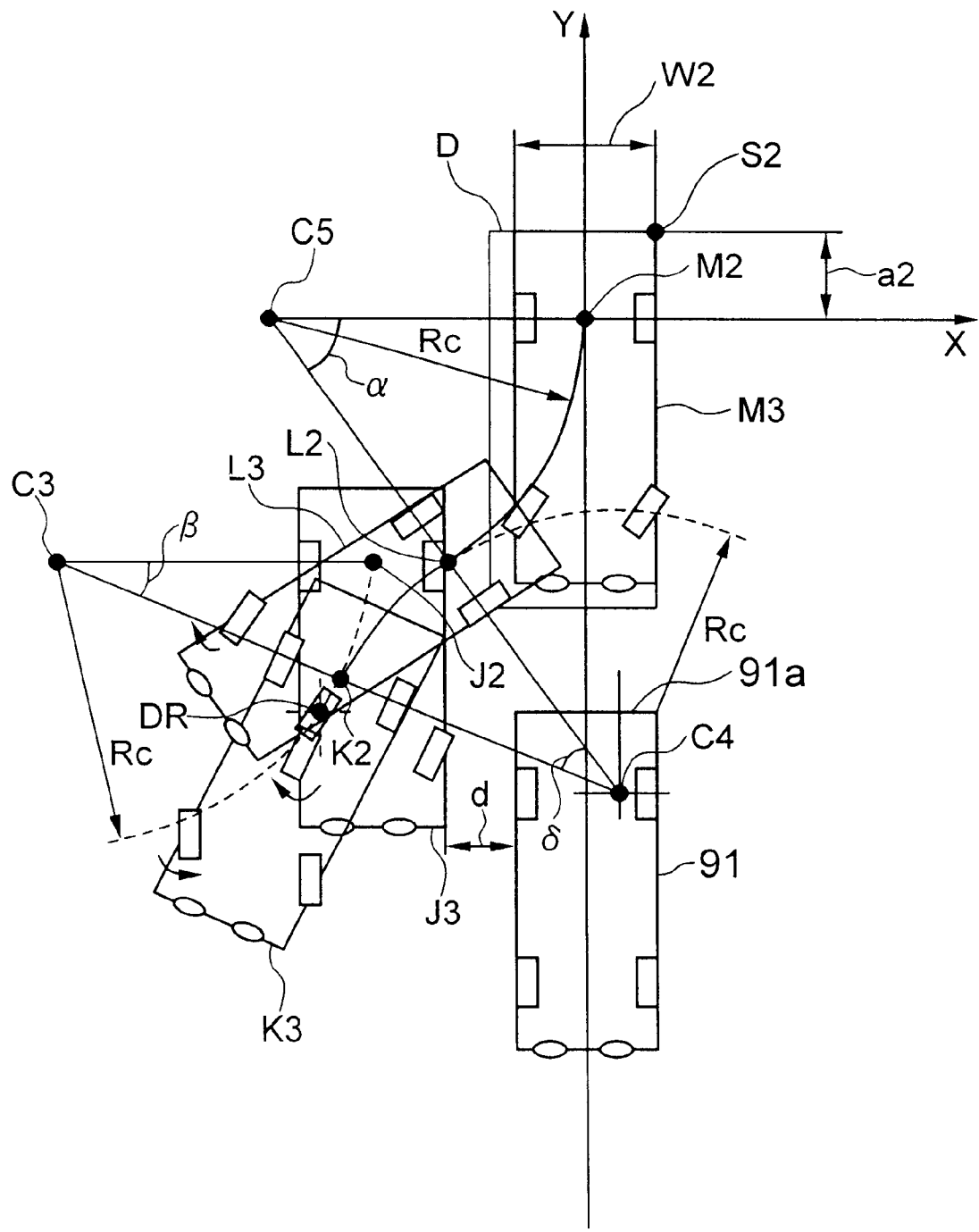
FIG. 14 is a view schematically showing, in a stepwise manner, the positions of the vehicle in parking in line in accordance with the fourth embodiment.

In the foregoing third to fifth embodiments, particularly in case of the in-line parking, as shown in, for example, FIG. 14, it is necessary to adjust the initial stop position J3 in X-direction while performing the operation so that the interval of the side surface of the vehicle 1 and the side surface of the parked vehicle 91 is kept at a predetermined vehicle interval d.

This operation is in general difficult. Actually, the distance is offset from the set value d. As a result, this displacement adversely affects the different of the parking completion position.

Therefore, in the embodiment 6, there is provided a distance sensor at the side portion of the vehicle 1 for measuring the distance between the vehicle 1 and the parked vehicle 91 or the like.

In the start of the in-line parking, the distance between the vehicle 1 and the parked vehicle 91 is measured by the distance sensor, the coordinate (J2x, J2y) of the rear axle center J2 of the initial stop position J3 is corrected on the basis of the measured data, and furthermore, the values α and β and the value δ obtained from these data are corrected and calculated. Thereafter, these values are used as the set values that become the target values in the in-line parking.

In the start of the parallel parking, the distance between the vehicle and the parked vehicle on the side of the parking space is measured so that it is possible to judge whether the parking is possible or not and to inform the driver of this information.

What is claimed is:

1. A steering assist apparatus comprising:
   a camera for picking up the rear side of a vehicle;
   a monitor disposed in a driver's compartment of the vehicle;
   a steering angle sensor for detecting a steering angle of a steering wheel; and
   a display controlling means for, when the vehicle reverses, displaying on said monitor an image by said camera and in the superimposed manner displaying on said monitor a guide display for assisting the drive of the vehicle in parking,
   said guide display including a steering start guide line fixedly displayed in a predetermined position of an image field of said monitor for guiding a steering start position for parking, and a steering amount guide mark displayed movably along said steering start guide line on the image field of said monitor in correspondence with a steering angle of the steering wheel detected by said steering angle sensor.

2. The steering assist apparatus according to claim 1, wherein the vehicle is reversed straight and perpendicularly to a parking space, the vehicle is stopped where a predetermined target point of the parking space within an image of said camera overlaps with the steering start guide line, the steering wheel is steered so that the steering amount guide mark overlaps with the target point, and the vehicle is further reversed while keeping the steering amount of the steering wheel to thereby park the vehicle suitably and in parallel in the parking space.

3. The steering assist apparatus according to claim 1, wherein the guide display includes an eye mark fixedly displayed of the image field of said monitor for guiding an opposite steering point of the steering wheel for parking the vehicle in an in-line manner.

4. The steering assist apparatus according to claim 3, wherein the vehicle is reversed straight in parallel with a road, the vehicle is stopped where a predetermined target point of the parking space within an image of said camera overlaps with the steering start guide line, the steering wheel is turned so that the steering amount guide mark overlaps with the target point, and the vehicle is further reversed while keeping the steering amount of the steering wheel so that the vehicle is stopped where the eye mark overlaps with the target point, and the steering angle of the steering wheel is increased up to a maximum level in the opposite direction where the vehicle is kept stopped, and under this condition, the vehicle is reversed to thereby park the vehicle suitably in the parking space in the in-line manner.

5. The steering assist apparatus according to claim 1, wherein the guide display further includes a pair of vehicle width guide lines fixedly displayed at a predetermined position of the image field of said monitor for showing a predicted position of both side portions of the vehicle when the vehicle is reversed straight.

6. The steering assist apparatus according to claim 1, wherein the guide display includes a steering start guide line for parking on the left side for performing the parking on the left rear side and a steering start guide line for parking on the right side for performing the parking on the right rear side.

7. The steering assist apparatus according to claim 6, wherein the guide display includes a left side parking eye mark for performing the parking on the left rear side and a right side parking eye mark for performing the parking on the right rear side.

8. The steering assist apparatus according to claim 7, wherein in response to the steering operation of the steering wheel, when the left rear parking is to be performed, color of the left side parking eye mark and that of the steering amount guide mark are the same and when the right rear parking is to be performed, the color of the right side parking eye mark and that of the steering amount guide mark are the same.

9. A parking assist apparatus for assisting a parking operation when a vehicle is reversed to be parked, comprising:
   a yaw angle detecting means for detecting a yaw angle of the vehicle;

a reference setting means for setting a reference angle of the yaw angle when the vehicle is at a reference position for starting to park;

a controller for identifying a position of the vehicle on the basis of the yaw angle set by said reference setting means and the yaw angle detected by said yaw angle detecting means; and a guide means for providing steering information to the driver on the basis of the position of the vehicle identified by said controller.

10. The parking assist apparatus according to claim 9, wherein a locus through the reference of the vehicle to a parking position comprises a plurality of arcs which circumscribe each other and have a constant radius respectively.

11. The parking assist apparatus according to claim 9, wherein the yaw angle detecting means includes a yaw rate sensor for detecting an angular velocity in a yaw direction of the vehicle.

12. The parking assist apparatus according to claim 9, wherein the yaw angle detecting means includes a steering angle sensor for detecting a steering angle of a steering wheel and a yaw rate sensor for detecting an angular velocity in a yaw direction of the vehicle.

13. The parking assist apparatus according to claim 9, wherein the yaw angle detecting means includes a steering angle sensor for detecting a steering angle of a steering wheel and a distance sensor for detecting a movement distance of the vehicle.

14. The parking assist apparatus according to claim 9, wherein the steering information includes guide information for at least one of turning the steering wheel in the opposite direction and maximizing the steering angle when the yaw angle becomes a predetermined angle.

15. The parking assist apparatus according to claim 9, wherein the steering information includes guide information for at least one of turning the steering wheel in the opposite direction and turning the steering wheel in the direction of the vehicle advancing straight.

16. The parking assist apparatus according to claim 9, wherein the steering information includes guide information for stopping the vehicle in a target parking position when the yaw angle becomes a predetermined angle.

17. The parking assist apparatus according to claim 9, wherein the steering information is provided to the driver in the form of a sound.

18. The parking assist apparatus according to claim 9, wherein the steering information is provided to the driver in the form of visual information.

19. The parking assist apparatus according to claim 12, wherein the steering information includes guide information for being able to steer to an appropriate steering angle on the basis of the steering angle detected by the steering angle sensor.

20. A parking assist apparatus for reverse parking, by conducting an advancing operation with a state of keeping a predetermined constant steering angle, then conducting a reverse operation with the state of turning the steering wheel in an opposite direction and keeping a predetermined constant steering angle, comprising:

a yaw angle detecting means for detecting a yaw angle of the vehicle;

a reference setting means for setting a reference angle of the yaw angle when a vehicle is at a reference position for starting to park;

a controller for identifying a position of the vehicle on the basis of the yaw angle set by said reference setting means and the yaw angle detected by said yaw angle detecting means; and a guide means for providing steering information to the driver on the basis of the position of the vehicle identified by said controller.

21. The parking assist apparatus according to claim 20, wherein said controller memorizes a setting value of the yaw angle of the vehicle corresponding to the reference position and identifies the position of the vehicle comparing the yaw angle detected by said yaw angle detecting means with the setting value of the yaw angle of the vehicle.

22. The parking assist apparatus according to claim 21, further comprising an adjusting means for modifying the setting value of the yaw angle.

23. The parking assist apparatus according to claim 21, wherein the setting value of the yaw angle which said controller memorizes is a value of a yaw angle corresponding to the vehicle reverse starting position for reverse parking.

24. The parking assist apparatus according to claim 21, wherein the setting value of the yaw angle which said controller memorizes is a value of a yaw angle corresponding to a position for a vehicle to turn a steering wheel for parking in line.

25. The parking assist apparatus according to claim 21, wherein the setting value of the yaw angle which said controller memorizes is a value of a yaw angle corresponding to a position for a vehicle to finish reversing for parking in line.

26. The parking assist apparatus according to claim 20, wherein said reference setting means sets vehicle position, wherein a position of the driver and a predetermined position with respect to a parking space are identified in the back and forth direction of a vehicle when the vehicle is parked in line, at the reference position.

27. The parking assist apparatus according to claim 21, wherein the setting value of the yaw angle which said controller memorizes is a value of a yaw angle corresponding to a position for a vehicle to turn a steering wheel in the direction of the vehicle advancing straight for parking in parallel.

28. The parking assist apparatus according to claim 20, wherein said reference setting means sets a vehicle position, wherein a position of the driver and a predetermined position with respect to a parking space are identified in the back and forth direction of a vehicle when the vehicle is parked in parallel, at the reference position.

29. The parking assist apparatus according to claim 20, further comprising a measuring means for measuring the vehicle reverse starting position in relation to a target parking position.

30. The parking assist apparatus according to claim 20, wherein said measuring means measures the distance between the vehicle and an obstacle at the side of the vehicle.

31. The parking assist apparatus according to claim 20, further comprising:

a camera for picking up the rear side of the vehicle; and a monitor disposed in the driver's compartment of the vehicle for displaying the image picked up by said camera, the steering information including a vehicle mark simulating the vehicle which substantially overlaps with a line for indicating the parking space on the monitor so as to inform the driver of the timing of at least one of turning the steering wheel in the opposite direction and maximizing the steering angle.

* * * * *

UNITED STATES PATENT AND TRADEMARK OFFICE
CERTIFICATE OF CORRECTION

PATENT NO. : 6,611,744 B1
DATED : August 26, 2003
INVENTOR(S) : Kazunori Shimazaki et al.

It is certified that error appears in the above-identified patent and that said Letters Patent is hereby corrected as shown below:

<u>Column 6,</u>
Line 46, should read -- $Y_{QO1} = -X_{pp} + WP/2 = R_p + WP/2$ --

<u>Column 13,</u>
Line 56, please delete "Land" and insert therefore -- and --

<u>Column 21,</u>
Line 29, should read -- $C4_x = C5_x + (R_c + R_c) \cdot \cos \alpha = -R_c + 2R_c \cdot \cos \alpha$ --

Signed and Sealed this

Eighteenth Day of November, 2003

JAMES E. ROGAN
*Director of the United States Patent and Trademark Office*